US011898953B2

(12) United States Patent
Gütle et al.

(10) Patent No.: US 11,898,953 B2
(45) Date of Patent: *Feb. 13, 2024

(54) PARTICULATE MATTER SENSOR DEVICE

(71) Applicant: Sensirion AG, Stäfa (CH)

(72) Inventors: Frank Gütle, Stäfa (CH); Ulrich Leidenberger, Stäfa (CH); Željko Mrčarica, Stäfa (CH); Stefan Kostner, Stäfa (CH); Stefan Thiele, Stäfa (CH)

(73) Assignee: Sensirion AG, Stäfa (CH)

(*) Notice: Subject to any disclaimer, the term of this patent is extended or adjusted under 35 U.S.C. 154(b) by 430 days.

This patent is subject to a terminal disclaimer.

(21) Appl. No.: 16/647,373

(22) PCT Filed: Mar. 13, 2018

(86) PCT No.: PCT/EP2018/056243
§ 371 (c)(1),
(2) Date: Mar. 13, 2020

(87) PCT Pub. No.: WO2018/100209
PCT Pub. Date: Jun. 7, 2018

(65) Prior Publication Data
US 2020/0271565 A1    Aug. 27, 2020

(30) Foreign Application Priority Data
Sep. 14, 2017   (EP) .................................. 17191019

(51) Int. Cl.
G01N 15/14         (2006.01)
G01N 1/22          (2006.01)
(Continued)

(52) U.S. Cl.
CPC ....... *G01N 15/1436* (2013.01); *G01N 1/2273* (2013.01); *G01N 15/06* (2013.01);
(Continued)

(58) Field of Classification Search
None
See application file for complete search history.

(56) References Cited

U.S. PATENT DOCUMENTS 3,809,913 A    5/1974   Prellwitz
5,247,188 A *  9/1993   Borden ................ G01N 1/2202
                                             356/338

(Continued)

FOREIGN PATENT DOCUMENTS

CN    1511073 A    7/2004
CN    1563950 A    1/2005
(Continued)

OTHER PUBLICATIONS

Extended European Search Report dated Mar. 4, 2021 in European application No. 20210378.4 (8 pgs.).
(Continued)

*Primary Examiner* — Matthew D Krcha
(74) *Attorney, Agent, or Firm* — Foley & Lardner LLP

(57) ABSTRACT

A particulate matter sensor device comprises an enclosure (21) defining a flow channel (2), a radiation source (3) for emitting radiation into the flow channel for interaction of the radiation with particulate matter in an aerosol sample in the flow channel, and a radiation detector (4) for detecting at least part of said radiation after interaction with the particulate matter. The sensor device comprises a flow modifying device (511) arranged upstream of the radiation detector and/or radiation source so as to reduce particulate matter precipitation onto the radiation detector, the radiation source and/or the channel wall sections in their proximity. The invention also relates to a method of determining parameters of particulate matter in an aerosol sample by using such a particulate matter sensor device.

33 Claims, 8 Drawing Sheets

(51) Int. Cl.
  *G01N 15/06* (2006.01)
  *G01N 15/00* (2006.01)
  *G01N 15/10* (2006.01)

(52) U.S. Cl.
  CPC . *G01N 15/1459* (2013.01); *G01N 2015/0046* (2013.01); *G01N 2015/03* (2013.01); *G01N 2015/0693* (2013.01); *G01N 2015/1062* (2013.01)

(56) References Cited

U.S. PATENT DOCUMENTS

| | | | |
|---|---|---|---|
| 5,360,980 A | 11/1994 | Borden et al. | |
| 6,159,739 A | 12/2000 | Weigl et al. | |
| 8,941,826 B2 | 1/2015 | Nawaz et al. | |
| 2002/0100416 A1* | 8/2002 | Sun | B05B 7/0012 118/302 |
| 2003/0235926 A1 | 12/2003 | Knollenberg et al. | |
| 2004/0057050 A1 | 3/2004 | Beck et al. | |
| 2009/0039249 A1* | 2/2009 | Wang | G01N 15/1459 250/282 |
| 2011/0286888 A1* | 11/2011 | Barlag | B01L 3/502707 422/82.01 |
| 2012/0196314 A1* | 8/2012 | Nawaz | G01N 21/05 356/338 |
| 2013/0047703 A1* | 2/2013 | Stengel | G01N 21/53 73/23.31 |
| 2014/0247450 A1 | 9/2014 | Han | |
| 2014/0264077 A1* | 9/2014 | Tokhtuev | G01N 21/49 250/226 |
| 2014/0273193 A1 | 9/2014 | Li | |
| 2016/0077218 A1 | 3/2016 | Loi et al. | |
| 2020/0249186 A1 | 8/2020 | Keller et al. | |

FOREIGN PATENT DOCUMENTS

| | | |
|---|---|---|
| CN | 102782582 A | 11/2012 |
| CN | 104111219 A | 10/2014 |
| CN | 104266948 A | 1/2015 |
| CN | 104914024 A | 9/2015 |
| CN | 105324802 A | 2/2016 |
| CN | 205080028 U | 3/2016 |
| CN | 106483052 A | 3/2017 |
| DE | 20 2017 106 413 | 10/2017 |
| GB | 2 544 196 | 5/2017 |
| JP | H01-265137 A | 10/1989 |
| JP | H04-353748 | 12/1992 |
| JP | 2004-264146 | 9/2004 |
| JP | 2014-228276 | 12/2014 |
| KR | 101623787 | 5/2016 |
| WO | WO-2004/001382 A2 | 12/2003 |
| WO | WO-2008/105726 | 9/2008 |
| WO | WO-2017/054098 A1 | 4/2017 |

OTHER PUBLICATIONS

Office Action dated Jul. 24, 2019 in European Appl. 18709365.3 (9 pgs.).
Office Action in JP Patent Application No. 2020-514900 dated Jan. 4, 2022, 8 pages (including English Translation).
International Search Report and Written Opinion dated Jun. 6, 2018 in PCT/EP2018/056243 (13 pages).
Office Action dated Jul. 8, 2021, Korean Patent Application No. 10-2020-7005637 in Korean only, 4 pages.
Extended European Search Report dated Sep. 7, 2021, European Patent Application No. 21175323.1, 8 pages.
First Office Action for CN 201880000211.1 dated Sep. 1, 2021 (27 pages).
Non-Final Office Action on U.S. Appl. No. 17/478,808 dated Apr. 6, 2022.

* cited by examiner

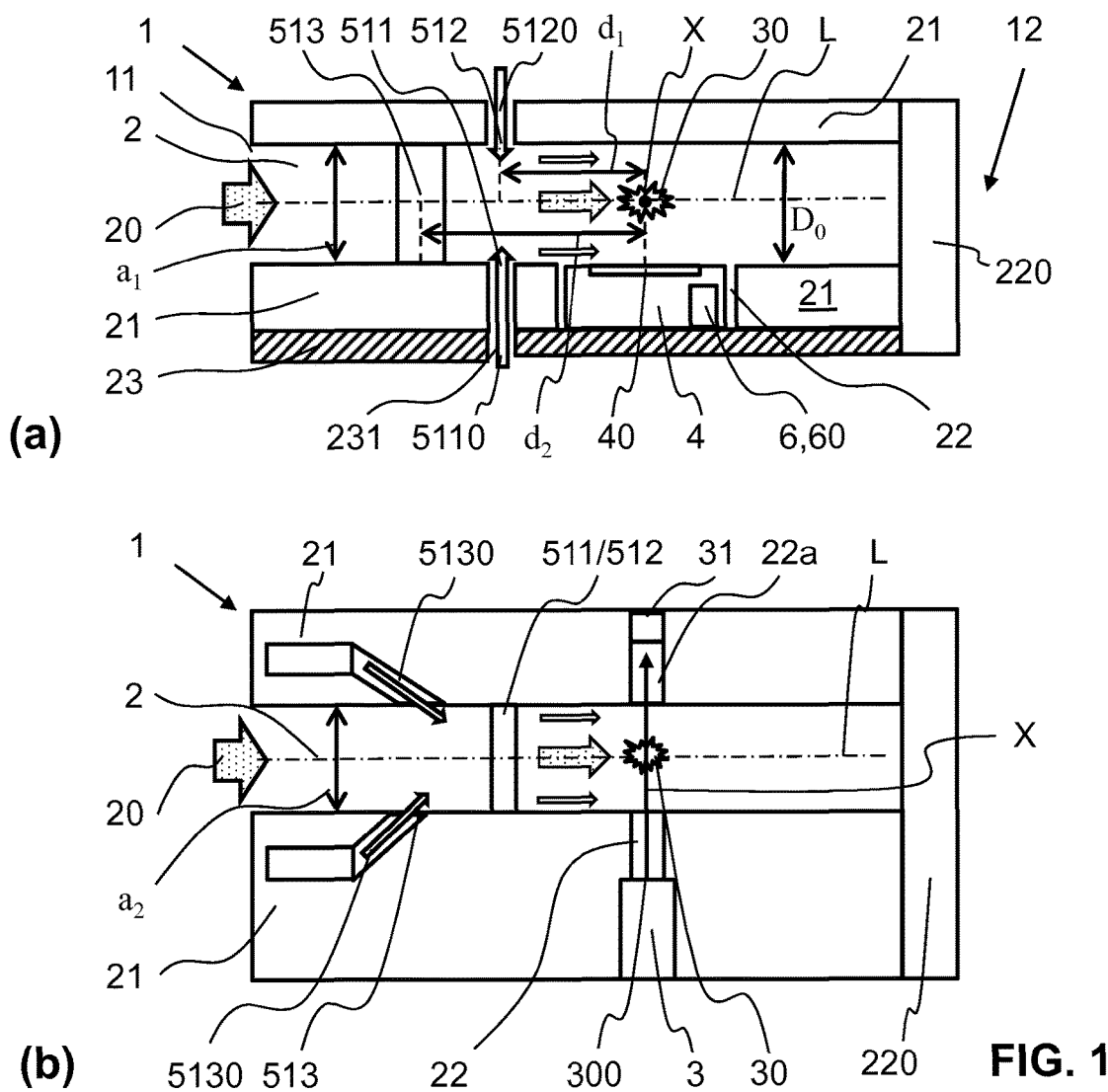
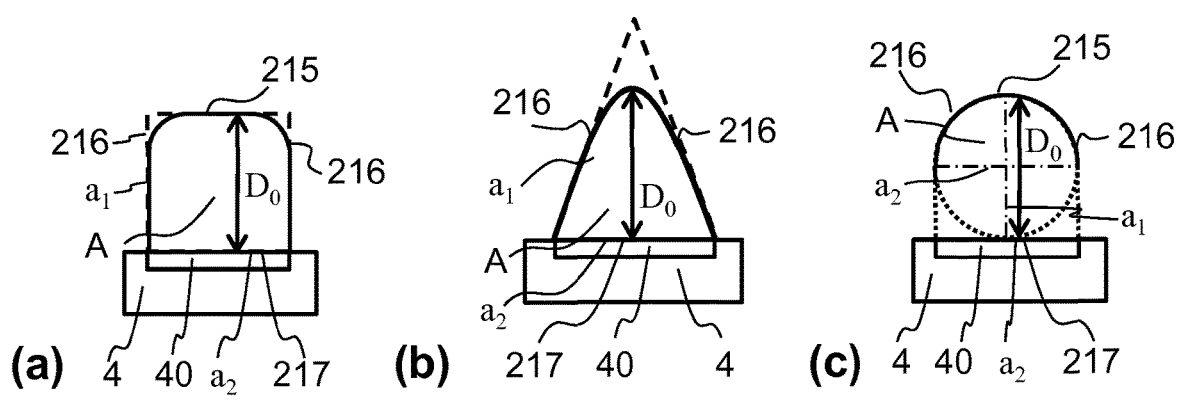
FIG. 1
FIG. 2

(a)

(b)

PARTICULATE MATTER SENSOR DEVICE

CROSS REFERENCE TO RELATED APPLICATIONS

This application is a national stage entry of International Application No. PCT/EP2018/056243 filed Mar. 13, 2018, which claims priority to European Application No. 17191019.3, filed Sep. 14, 2017.

TECHNICAL FIELD

The present invention relates to a particulate matter sensor device, in particular to an optical particulate matter sensor device, for ascertaining a number concentration and/or a mass concentration of particulate matter in air.

PRIOR ART

WO 2017/054098 A1 discloses a low cost optical particle sensor for determining a particle concentration.

US 2014/0247450 A1 discloses a system and a method of measuring a particle's size in a select aerosol using the optical diameter of the particle to perform a mobility and/or aerodynamic diameter conversion without any knowledge about the particle's shape and its optical properties in the aerosol being characterized. It discloses the use of a substantially clean flow of gas that shrouds or sheaths the aerosol flow. The cleansed sheath flow helps contain particulates within the core of the aerosol flow as it passes through the optics chamber, thereby mitigating against particulate contamination of the optics chamber and appurtenances therein.

SUMMARY OF THE INVENTION

It is an object of the present invention to specify a low-cost particulate matter sensor device with improved long-term stability.

According thereto, a particulate matter sensor device for detecting and/or characterising particulate matter in a flow of an aerosol sample, for example ambient air, guided through the particulate matter sensor device is suggested. The particulate matter sensor device comprises an enclosure, the enclosure comprising an inlet and an outlet for the flow, and the enclosure being arranged and configured for defining a flow channel for guiding the flow of the aerosol sample through the particulate matter sensor device from the inlet to the outlet. The flow channel is preferably essentially closed, i.e. all the aerosol guided into the inlet is released from the outlet, while extra gas may be injected by the flow modifying device as outlined below. In some embodiments, some of the aerosol sample is drawn through one or more additional outlets out of the channel. A total additional flow into the channel or out of the channel between the inlet and the outlet is preferably less than 30%, more preferably less than 25%, particularly preferred less than 20% of the flow into the inlet. Furthermore, the particulate matter sensor device comprises:

a radiation source arranged and configured to emit radiation at least partially into the flow channel for interaction of the radiation with at least some of the particulate matter in the flow of the aerosol sample; it is conceivable that even fractions of 10% or less of the flowing particulate matter are hit by the radiation, wherein the device rescales the measured value based on models and/or calibration data; preferably, the radiation source is a light source such as a laser or a light emitting diode;

a radiation detector arranged and configured to detect at least part of the radiation that has interacted with the particulate matter; the radiation detector, preferably an optical detector, is a structure for detecting radiation of the radiation source that is indicative of characteristics or presence of particulate matter. The detected radiation may be scattered and/or refracted radiation, and/or a non-absorbed part of the light, from which the desired information about the particulate matter is deduced.

The above-stated object is achieved by including into the flow channel a flow modifying device arranged closely upstream of the radiation detector and/or of the radiation source, and configured to at least locally modify the flow, preferably the velocity, direction, and/or aerosol density of the aerosol sample in the region of the location of the radiation detector and/or the radiation source and/or of the channel wall sections in close proximity to the radiation source and/or radiation detector, respectively, for reducing particulate matter precipitation onto the radiation detector and/or onto the radiation source and/or onto the channel wall sections in close proximity to the radiation source and/or radiation detector; this modifying device may be one or more constrictions in the channel and/or one or more additional gas flow openings that produce an additional gas flow into or from the flow channel. The constriction may be put into practice by changing the shape of the flow channel wall or by placing an object, for example a ramp or bump or the like, in the flow channel.

Typical exterior dimensions of the particulate matter sensor device are smaller than 10 centimeters each in length, width and height, preferably smaller than 5 centimeters each in length and width and smaller than 1.5 centimeters in height. The height is extending perpendicular to the length extension of the flow channel. In other embodiments, the height can be larger than or equal to 1.5 centimeters, e.g., between 1.5 and 3 centimeters.

In the context of the present invention, the term "particulate matter" refers to an ensemble of solid and/or liquid particles suspended in a gas, preferably in air. This mixture may include both organic and inorganic particles, such as dust, pollen, soot, smoke, and liquid droplets. Subtypes of particulate matter include "PM10" which are particles with a diameter of 10 micrometers or less, "PM2.5" which are particles with a diameter of 2.5 micrometers or less, and "PM1.0" which are particles with a diameter of 1 micrometer or less.

In the context of the present invention, the term "aerosol" refers to a colloid of solid particles and/or liquid droplets in air or another gas. Examples of aerosols are particulate matter in air, smoke, haze, dust and fog.

In the context of the present invention, the term "detecting and/or characterising particulate matter" includes deriving a particulate matter number concentration, a mean particulate matter mass and/or a particulate matter mass concentration.

In the context of the present invention, the term "radiation source" may refer, for some embodiments, to a laser, preferably to a laser diode, most preferably to a laser diode emitting visible light. It is also conceivable, however, that the emitter is a light emitting diode.

In the context of the present invention, the term "radiation detector" may refer to a photo diode, preferably to a surface mount device photo diode. Generally, the radiation detector receives radiation from the source that it converts into an electrical signal.

Through signal analysis, particle mass, size distribution, number concentration or other characteristics of the particulate matter may be obtained by operation of integrated circuitry and/or one or more microprocessors. The area of the radiation detector that is sensitive to radiation is referred to as detection or sensitive area. Often, when light is used, optical collection techniques may be used that are sensitive to precipitation of particles which disturbs the measurement. In some embodiments, the radiation detector is a surface mount device photo diode.

In some embodiments, the detection area is smaller in size than the radiation detector. In some embodiments, the radiation detector is arranged and configured to be shaded from the direct radiation of the radiation source.

In the context of the present invention, the term "interaction of radiation with particulate matter" may encompass scattering, refraction and absorption of radiation by the particulate matter.

In the context of the present invention, the term "enclosure" is to be understood as a casing structure that at least partly delimits the flow channel. It may be a single piece or a multiple-piece element. Preferably, it is a moulded object.

In the context of the present invention, the term "closely upstream" is to be understood as at an upstream distance which is small enough to allow the flow modifying device to be effective in modifying the flow in the region of the radiation detector and/or the radiation source and/or the channel walls in close proximity to the radiation detector and/or the radiation source for reducing the particle precipitation onto the radiation detector and/or the radiation source and/or the channel wall sections in close proximity to the radiation detector and/or the radiation source.

Typically, this distance referred to by the term "closely upstream" may be in a range of a fraction of or a couple of flow channel diameters. This distance may be up to 30 millimeters, preferably, up to 10 millimeters, preferably up to 8 millimeters, and particularly preferred in a range of from 1 millimeter to 6 millimeters.

Typically, the distance referred to by the term "close proximity" may be in a range of a fraction of or a couple of flow channel diameters. This distance may be up to 30 millimeters, preferably, up to 10 millimeters, preferably up to 8 millimeters, and particularly preferred in a range of from 1 millimeter to 6 millimeters. This term includes wall sections that adjoin the detector and/or source and that preferably extend over such a distance.

In other words: The above-stated object is achieved by including into the flow channel a flow modifying device, wherein the flow modifying device is arranged closely upstream of a measurement region, in which measurement region the radiation interacts with the particulate matter when the particulate matter sensor device is in use, such that particle precipitation in the measurement region is reduced. The measurement region is a volume of the channel where the radiation interacts with the particulate matter. Preferably, the measurement region comprises the volume where the radiation passes through the channel (i.e. the radiation path volume of the direct radiation beam) and furthermore a volume therearound, e.g. up to a distance of 30 millimeters, preferably of 10 millimeters, more preferably of 8 millimeters, and particularly preferably in a range of from 1 millimeter to 6 millimeters from the radiation path volume). The particle precipitation in the measurement region may lead, over time, to a deposition of a dirt layer onto the radiation detector and/or the radiation source and/or any wall section in the measurement region. Accordingly, in effect, the decreased particle precipitation in the measurement region according to invention leads to less deterioration of the radiation source and/or the detector (if arranged in the measurement region) and/or to less disturbing radiation effects such as, for example, diffuse back-scattering on polluted channel wall sections in the measurement region. Accordingly, general sensor deterioration is minimized and measurement accuracy increased.

In some embodiments, the radiation detector, or its sensitive area, is arranged in the measurement region.

In some embodiments, the radiation source, or its emitting area, is arranged in the measurement region.

Preferably, the flow modifying device is arranged such that it acts against the precipitation effect, in particular, if present, due to gravity, i.e. if the flow modifying device is a ramp or buckle like obstacle in the aerosol sample flow the deflection of the particles in the flow is such that the particle trajectory is changed to avoid it hitting the radiation detector and/or the radiation source.

In the context of the present invention, the term "inlet" refers to the inlet for the aerosol sample into the particulate matter sensor device and the term "outlet" refers to the outlet for the aerosol sample out of the particulate matter sensor device. In some embodiments, there may be additional components in front of the inlet and/or outlet, e.g. a fan and/or a flow meter. The term "additional flow opening/inlet/outlet" refers to additional openings in the channel between the inlet and outlet as defined above.

The particulate matter detector device according to the present invention comprises the flow modifying device, by means of which a contamination of the radiation detector and/or the radiation source by the microscopic particles of the particulate matter is reduced. This increases lifetime and accuracy of the sensor device. Generally, it makes the sensor less prone to building up a deposition layer of particulate matter on parts that receive and/or emit the radiation.

Preferably, the radiation source is arranged and configured to illuminate only a fraction of the particulate matter in the flow of the aerosol sample, e.g. less than 10%, as opposed to the entire particulate matter. Preferably a narrow radiation beam is used, wherein the radiation beam has a diameter that is equal to or less than a typical distance between two particles in the flow to be measured.

Preferably, the characteristics of the particulate matter, such as particulate matter number concentration, a mean particulate matter mass and/or a particulate matter mass concentration, are derived by comparing measurement data with calibration data.

In some embodiments, the radiation detector is mounted on a circuit board. The circuit board may be one of a printed circuit board, either in a non-flexible or in a flexible form, a ceramic circuit board, or a different kind of a circuit board allowing the elements carried to be electrically interconnected.

In some embodiments, the enclosure is arranged and configured for receiving the circuit board. The circuit board may be delimiting a part of the flow channel. The radiation source may be arranged on the circuit board.

In some embodiments, the enclosure comprises or consists of a first enclosure element which is a moulded element. The enclosure may be a single-piece element. In some embodiments, the enclosure comprises or consists of a first and a second enclosure element which are both moulded elements. The moulding may be an injection moulding process. The enclosure may also comprise more than two elements.

In some embodiments, the enclosure is essentially a massive body with a longitudinal cavity that extends from an inlet to an outlet in the body, wherein the cavity forms the flow channel. In other embodiments, the flow channel is defined by a body comprising two or more shells of the enclosure that are fitted together to create the longitudinal cavity. This longitudinal cavity may extend completely in said body or it may be, at least partially, open radially outwardly, wherein the open regions may be covered by cover elements, for example, by a circuit board. The circuit board may, however, also be integrated into any closed longitudinal cavity.

The flow channel may be essentially closed, i.e. the flow channel is arranged and configured to guide the flow of the aerosol sample through the particulate matter sensor device from the inlet to the outlet and that is arrange and configured to minimize dead volume, i.e. volume without flow, in fluid communication except where necessary e.g. due to fabrication tolerances.

In some embodiments, the channel has an increased cross-sectional area upstream and/or downstream of the measurement region. This increased cross-section leads to a decreased overall flow resistance of the channel, which increases energy-efficiency. Furthermore, this allows, in some embodiments, to downsize a fan arranged in the device for establishing and/or controlling the flow through the channel.

In some embodiments, the cross-section may be substantially constant along the channel.

In some embodiments, specific separation chambers or volumes may be arranged in the channel, in particular upstream of the measurement region, for removing some of the particulate matter from the air flow.

Preferably, these separation chambers or volumes may have steep downstream wall with respect to the longitudinal direction of the channel, some may have downstream walls that are extending at right angles to the longitudinal direction of the channel. Such steep downstream walls allow for a particularly efficient collection of particulate matter from the flow.

Alternatively or additionally, these separation chambers of volumes may collect particulate matter by providing depressions or wells with depths in gravitation direction such that the gravity pulls some of the particulate matter into the depressions or wells where the matter is trapped and thereby effectively removed from the flow.

Moreover, such separation chambers or volumes may locally increase the cross-sectional area, which locally decreases flow velocity which, in turn, increases particulate matter dwelling time in this area whereby gravity has more time to separate some of the matter out of the flow onto channel walls. Thereby, more matter may be trapped on channel walls.

The size of such a chamber may be $8 \times 5 \times 10$ mm$^3$.

Such separation chambers or volumes are particularly preferred in embodiments with a triangular cross-sectional shape.

In some embodiments, the particulate matter sensor device comprises a fan arranged and configured to generate and/or to control the flow velocity of the aerosol sample through the particulate matter sensor device from the flow inlet to the flow outlet, said flow velocity being preferably in a range of from 0.2 meters per second to 10 meters per second. In the context of the present invention, the term "fan" refers to a device used to create flow. Examples of fans comprise axial and centrifugal fans. Centrifugal fans are also referred to as blowers. The fan may be arranged at the inlet or at the outlet or between inlet and outlet.

However, in an alternative embodiment, the particulate matter sensor does not comprise a fan but the flow of the aerosol sample is provided for externally.

In some embodiments, the particulate matter sensor device comprises a microprocessor and/or integrated circuitry arranged and configured to process an output signal of the radiation detector to derive a particulate matter number concentration and/or a particulate matter average mass and/or a particulate matter mass concentration. In some embodiments, the radiation detector provides an electrical signal proportional to incident radiation. This electrical signal may then be feed through an analog-to-digital converter and the output may be analysed by means of a signal analysing unit comprising the microprocessor and/or integrated circuitry, for deriving the desired parameter.

In some embodiments, the microprocessor and/or the integrated circuitry is mounted on the circuit board.

In some embodiments, the microprocessor and/or the integrated circuitry is integrated with the radiation detector and/or the radiation source.

In some preferred embodiments, the particulate matter sensor comprises a flow meter for determining a flow in the flow channel at the inlet, at the outlet and/or therebetween.

In some embodiments, the flow modifying device comprises or consists of at least one additional flow opening for creating at least one additional flow into or from the flow channel. Preferably, the opening is an inlet through which one additional flow is introduced into the flow channel.

In some embodiments, the flow channel is radially delimited by a first wall section, a second wall section, and at least one third wall section, wherein said at least one additional flow opening is arranged: (i) in said first wall section for introducing a first additional flow into the flow channel; and/or (ii) in said second wall section for introducing a second additional flow into the flow channel; and/or (iii) in at least one of the at least one third wall section for introducing a third additional flow into the flow channel.

In some embodiments, at least one of said at least one additional flow opening has a cross-section that is preferably: (i) essentially point-like for producing a confined jet-like additional flow; or (ii) slit-like for producing a sheet-like additional flow. A series of jet-like additional flow openings may be arranged in a row such as to produce a sheet-like additional flow.

Preferably, the slit-like additional flow opening extends in circumferential direction with respect to the cross-section of the flow channel and preferably partially or entirely around the cross-section of the flow channel.

In some preferred embodiments, the flow channel has a cross-section that is essentially constant along a length of the flow channel.

The flow channel may be rectilinear or substantially rectilinear. It may have one, two or more bends, such as U shape. The detector and/or radiation source may be arranged downstream of a bend, preferably only 1 to 3 channel diameters downstream thereof. In other embodiments, the detector and/or radiation source may be arranged 4 to 5 channel diameters downstream of a bend.

A typical cross-sectional width of the flow channel perpendicular to the direction of the flow may be in the range or from 1 millimeter to 10 millimeters, preferentially between 2 millimeters and 5 millimeters. The cross-sectional width and/or the shape of the cross section of the flow channel may vary along the channel. Examples of shapes include shapes that are completely or partly rectangular, square, elliptical, spherical and triangular. Angles and edges may be rounded.

Accordingly, the wall sections may be planar or curved or may comprise, depending the cross-sectional shape of the flow channel, one or more edges. The wall sections may be part of a single piece pipe element or may be fitted together. The first wall section may be the bottom wall section (e.g. with respect to gravity), the second wall section may be a top wall section, and the third wall sections may be lateral wall sections. Angles and edges may be rounded.

In some embodiments, the flow channel may have an essentially constant sectional area along at least 50% to 95% of or its entire length.

In some preferred embodiments, the cross-sectional area of the flow channel is triangular, while additional flow openings are arranged in all three wall sections. Preferably, the additional flow openings are slit-like and, preferably, extend in circumferential direction with respect to the cross-section of the flow channel and, preferably, extend entirely around the cross-section of the flow channel. A triangular flow channel with slit-like openings extending partially or entirely around the cross-section of the flow channel has the advantage, that it can reduce particulate matter precipitation onto the radiation detector, onto the radiation source and onto the wall surface in close proximity to radiation source and detector, while it can be fabricated in mould, including the line that feeds the additional flow, with only one or only two enclosure elements.

In some embodiments, a filter is built into the sensor device, the filter being associated with the at least one additional flow opening such that the additional flow is a filtered flow. The filter may be an air filter, in particular a HEPA filter, or a path filter. Introducing filtered additional flow may reduce the particulate matter density in the region of the detector and/or source, which reduces precipitation. In other words, the additional flow may, in some embodiments, dilute the aerosol sample at least locally.

A further aspect of the additional flow is that the by introducing the flow, trajectories of the particulate matter may be redirected such that a precipitation onto the radiation detector and/or the radiation source and/or onto the channel wall sections in close proximity of the detector and/or source may be avoided. Accordingly, even if an additional flow is containing pollutants, its redirection effect in the interplay with the aerosol sample flow may reduce sensor degradation. It is particularly preferred, that the flow modifying device acts against the gravitation force guiding particulate matter on the detector and/or source. Accordingly, the modifying device is preferably arranged in the bottom region of the flow region (with respect to the gravitation direction).

The gas for the additional flow may be drawn from the same reservoir as the aerosol sample is drawn from, or it may be feed from another reservoir.

In some embodiments, one or more additional flow openings are preferably arranged at a first distance of less than 8 millimeters, preferably in a range of from 1 millimeter to 6 millimeters, upstream of the radiation detector and/or the radiation source, respectively.

In some embodiments, the at least one additional flow opening is an inlet that is supplied by a gas drawn into the particulate matter sensor device from a secondary inlet which is separate from the flow inlet. In other embodiments, the additional flow opening is connected to an under pressure such that it draws aerosol out of the flow channel.

In some embodiments, the particulate matter sensor device is configured such that the at least one additional flow through the at least one additional flow opening is suction based. In suction-based embodiments, there is no need to install an extra fan, i.e. ventilator, for introducing the additional flow into the flow channel. Also, the gas does not have to be pushed through the inlets by other means.

In some embodiments, the particulate matter sensor device further comprises at least one first recess arranged in said flow channel, the first recess being configured for receiving the radiation source and/or the radiation detector. The first recess is open to the channel at least of the radiation. Arranging the radiation source and/or the radiation detector in the first recess protects the sensitive elements from precipitation of particles as the recess is a region with reduced flow and the sensitive element is place offset out of the main flow. Furthermore, in some of these or other embodiments, a further recess, open to the channel at least for the radiation, is arranged and configured for receiving a beam stopper. The recess for the beam stopper may extend in a rectilinear manner or it may be curved or angled, wherein, in the non-rectilinear case, the radiation beam is reflected onto the beam stopper. By means of the latter recess shape it is avoided that stray radiation reflected from the region of the beam stopper is re-entering the flow channel, which would cause a disturbance to the measurement.

These recesses for detector and/or radiation source may constitute, with their openings to the channel, additional flow openings through which additional flows may enter the flow channel. For implementing this function, these recesses may be supplied by gas or gas is drawn from them. By combining such a recess with an additional flow opening a compact design and particularly efficient protection of the sensitive element arranged in said recess is achieved. Accordingly, in some embodiments, at least one of said at least one additional flow opening is preferably arranged in the first recess and/or in the second recess, respectively, such that at least one of said at least one additional flow enters the flow channel from the first recess and/or from the second recess, respectively. Accordingly, the sensitive element that is arranged in the first recess is additionally protected from the particulate matter in the aerosol sample flowing in the flow channel by an additional flow that flows around the sensitive element.

In some embodiments, the radiation detector is mounted on the circuit board. This allows for a compact design. The radiation detector may, in some embodiments, be a surface-mount device photo diode.

In some embodiments, the sensor device is configured such that, in use, at least one additional flow traverses the circuit board through one or more through-holes. This allows for a particularly compact design.

In some embodiments, at least one of said at least one additional flow opening is arranged and configured to introduce an additional flow so that it sheaths the radiation detector and/or the radiation source. In some embodiments, the sheath is a local dilution and/or a local stream that diverts matter on a different trajectory, which avoids deposition onto the element protected by the sheath.

In some embodiments, the at least one flow modifying device is configured for introducing into the flow channel said at least one additional flow such that a magnitude of said at least one additional flow, in total, equals to or is less than 30 percent, preferably less than 25 percent, more preferably less than 20 percent of a magnitude of the flow of the aerosol sample through the flow channel upstream said at least one flow modifying device.

In some embodiments, the flow modifying device comprises or consists of a constriction in or of the flow channel. The constricting is a structure that locally reduces the cross-sectional area of the flow channel. The constriction may be formed directly by the walls of the flow channel and/or additional structures may be arranged in the channel. The constriction may be arranged and configured to direct at least part of the flow of the aerosol sample away from a detection area of the detector and/or away from an emitting area of the radiation source. Due to the inertia of the particulate matter, the particles' trajectories are thereby diverted from the radiation detector and/or the radiation source.

The additional flow opening(s) and the constriction(s) may also be combined.

In some embodiments, said constriction is arranged and configured such that a constriction maximum of said constriction, i.e. the position where the constriction maximally reduces the flow channel diameter, is located at a second distance of less than 5 millimeters, preferably less than 3 millimeters, upstream of the radiation detector and/or the radiation source.

In some embodiments, said constriction constricts the flow channel, in the flow direction, in a continuous manner. In other words: the clear width of the flow channel in the constriction region before and/or after the constriction maximum changes monotonically or strictly monotonically. This avoids unnecessary turbulences in the flow. The constriction may extend over a part or the entire flow channel in the circumferential direction.

A ratio of a constricted clear minimum width at the constriction maximum and an average flow channel diameter is in a range of from 0.2 to 0.95, preferably of from 0.3 to 0.6.

The constricted clear minimum width $D_1$ may be in a range of from 1 millimeter to 5 millimeters and/or said average flow channel diameter $D_0$ being preferably in a range of from 1 millimeter to 15 millimeters, preferably of from 2 millimeters to 8 millimeters.

In some embodiments, said constriction extends over a constriction region, wherein the constriction, in downstream direction, rises up to its constriction maximum and falls back. The radiation detector and/or the radiation source are arranged in a constriction recess that is arranged in said constriction region and that extends radially into said constriction, said constriction recess being preferably a blind hole and/or having a diameter $D_{PD}$, in flow direction, of preferably 0.5 millimeters to 5 millimeters. Radiation may easily enter or exit the recess whilst particle precipitation into the recess is reduced. Preferably, this recess is arranged downstream of the constriction maximum.

In some embodiments, the distance between the detecting area of the radiation detector and the constriction maximum is less than two third of a downstream half-length of the constriction region.

In some embodiments, an opening angle change per millimeter β of said constriction is in a range of from 1° per millimeter to 10° per millimeter.

In some embodiments, a maximum opening angle $\Theta_{max}$ of said constriction is preferably in a range of from 1° to a stall angle SA, said stall angle SA being preferably in a range of 5° to 10°. The stall angle is the angle at which, towards higher angles, the flow stalls. It is, however, also conceivable that the maximum opening angle is larger than the stall angle. A distance $L_0$ between said constriction center and a position of said maximum opening angle $\Theta_{max}$ is preferably chosen according to the formula:

$$L_0 = \frac{\Theta_{max}}{\beta}$$

In some embodiments, the constricted clear minimum width $D_1$ is chosen according to the formula:

$$D_1 \leq D_0 + \frac{2}{\beta}\log(\cos(\beta * L_0))$$

In some embodiments, a distance $L_1$ between said constriction center and a position of said stall angle SA is preferably chosen according to the formula:

$$L_1 = \frac{SA}{\beta}$$

In some embodiments, a distance $L_2$ between said constriction center and a downstream edge of said constriction recess with diameter $D_{PD}$ is preferably chosen according to the formula:

$$D_{PD} < L_2 < L_1.$$

In some embodiments, the flow modifying device comprises at least one constriction and at least one additional flow opening, the at least one additional flow opening comprising preferably at least one flow inlet that is arranged upstream or downstream of a constriction maximum of the constriction.

In some embodiments, the particulate matter sensor device comprises at least two flow channels that extend separately from one another and at least two radiation detectors, wherein at least one of the at least two radiation detectors is arranged in each of the at least two flow channels. Accordingly, the sensor device is a two or more-channel device.

In some embodiments, the enclosure preferably is arranged and configured to receive the circuit board and/or wherein the at least two radiation detectors are preferably mounted on the same circuit board.

In a further aspect, the present invention relates to a method for detecting and/or characterising particulate matter in a flow of an aerosol sample, comprising the steps of:

guiding the flow of the aerosol sample through a flow channel of a particulate matter sensor device preferably according to invention;

emitting radiation into the flow channel from a radiation source for interaction with the particulate matter in the flow of the aerosol sample;

detecting, by means of a radiation detector and preferably under control of integrated circuitry and/or at least one microprocessor, at least part of the radiation that has interacted with the particulate matter; and at least locally modifying the flow, preferably the velocity, direction and/or aerosol density of the aerosol sample in the region of the radiation detector and/or the radiation source and/or of the channel wall in close proximity to the radiation source and/or radiation detector by means of a flow modifying device arranged closely upstream of the radiation detector or the radiation source, respectively, for reducing particulate matter precipitation onto the radiation detector and/or onto the radiation source and/or onto said channel wall sections, respectively.

The particulate matter sensor device according the present invention may be used to detect and/or characterize particulate matter in an aerosol sample, in particular in ambient air. A particulate matter number concentration and/or a particulate matter average mass and/or a particulate matter mass concentration may be determined.

Accordingly, the present invention relates to a particulate matter sensor device comprising an enclosure, the enclosure comprising a flow inlet, a flow outlet and a flow channel extending therebetween, a radiation source for emitting radiation into the flow channel for interaction of the radiation with the particulate matter in the flow of an aerosol sample when guided through the flow channel, a radiation detector for detecting at least part of said radiation after interaction with the particulate matter. The sensor device further comprises a flow modifying device arranged upstream of the radiation detector and/or onto the radiation source, and configured to modify the flow of the aerosol sample for reducing particulate matter precipitation onto the radiation detector and/or onto the radiation source and/or onto the channel walls in close proximity to the detector and/or source. The invention also relates to a method of determining parameters of particulate matter in an aerosol sample by using a particulate matter sensor device with such a flow modifying device.

Sensor embodiments according to aspects of the invention are less prone to degradation and therefore have a longer lifespan and/or require less maintenance. Thanks to these characteristics, the device embodiments may be used e.g. as personal monitors that allow individuals to measure their exposure to particulate matter. The device embodiments can also be embedded in a wide range of products and systems, including but not limited to air conditioning units, air purifiers, transportation vehicles, Internet of Things sensor nodes, mobile handsets, and wearable devices. The device embodiments can log air quality data in a stand-alone mode or communicate it wired or wirelessly to other devices such as smartphones and/or any other suitable devices. The air quality data may be coupled with information about the measurement's location to create a dense air quality map.

The particulate matter sensor device can further comprise at least one environmental sensor for determining at least one environmental parameter. In embodiments in which the flow modifying device comprises or consists of at least one additional flow opening for creating at least one additional flow into the flow channel, the environmental sensor can advantageously be arranged in a flow path of the additional flow upstream from the additional flow opening.

Thus the present invention also provides a particulate matter sensor device comprising:

an enclosure defining a flow channel;

a radiation source for emitting radiation into the flow channel for interaction of the radiation with particulate matter in an aerosol sample in the flow channel;

a radiation detector for detecting at least part of said radiation after interaction with the particulate matter;

at least one additional flow opening for creating an additional flow into the flow channel; and an environmental sensor for determining at least one environmental parameter, the environmental sensor being disposed in a flow path of the additional flow upstream from the additional flow opening.

The environmental sensor is configured to determine one or more parameters in the additional flow. Since the additional flow originates from the environment of the particulate matter sensor device, the output of the environmental sensor can be taken as an indication of such parameters in the environment of the particulate matter sensor device, i.e., environmental parameters.

Environmental parameters to be sensed by the environmental sensor typically represent physical quantities of a medium in the environment of the sensor module, which medium preferably is air. Environmental parameters may for instance be a relative humidity of the environment, a temperature of the environment of the sensor module, or at least one target gas concentration in the environment. Specifically, the target gas may include a mixture of gases, such as volatile organic compounds, or individual gases, such as individual volatile organic compounds (e.g. ethanol, formaldehyde, isopropanol), nitrogen oxide, hydrogen, ozone, carbon monoxide, ammonia, or carbon dioxide. In particular, the environmental sensor can be one or more of:

- a humidity sensor;
- a temperature sensor;
- a combined humidity and temperature sensor;
- a gas sensor, in particular:
  - a MOX-based gas sensor;
  - an optical gas sensor;
  - a photoacoustic gas sensor;
  - a thermal gas sensor;
  - an electrochemical gas sensor, in particular
    - a solid-state electrochemical gas sensor;
    - a room temperature organic liquid electrochemical gas sensor.

The environmental sensor can be a semiconductor sensor. The environmental sensor can comprise integrated control and/or readout circuitry. In particular, the environmental sensor can be a layered semiconductor sensor fabricated in CMOS technology. Such sensors are well known in the art. For instance, semiconductor humidity and temperature sensors are commercially available as the SHT3x series from Sensirion AG (https://www.sensirion.com/en/environmental-sensors/humidity-sensors/). Gas sensors are commercially available, e.g., as the SGP3x series from Sensirion AG (https://www.sensirion.com/en/environmental-sensors/gas-sensors/).

The particulate matter sensor device can comprise a filter for filtering the additional flow. In such embodiments, the environmental sensor is preferably arranged downstream from the filter. In this manner, the environmental sensor is protected from contamination by particulate matter.

The flow path of the additional flow upstream from the additional flow opening can be delimited by an enclosure, in particular, by the same enclosure that also delimits the (main) flow channel for the aerosol. The enclosure can define separate inlets for the primary flow of the aerosol through the flow channel and for the additional flow, i.e., it can define a primary flow inlet into the flow channel and a secondary flow inlet for receiving a gas that is to form the additional flow, the secondary flow inlet being separate from the primary flow inlet.

The particulate matter sensor device can be configured to create a negative pressure at the secondary flow inlet. For instance, this can be achieved by accelerating a flow of the aerosol sample in the flow channel, e.g., by providing a constriction in the flow channel, making use of the Bernoulli effect, as it is well known in the art. Other means of creating a pressure difference are also well known.

In some embodiments, the particulate matter sensor device is configured such that the additional flow flows past the radiation detector to protect the radiation detector from unwanted deposition of particulate matter. To this end, the radiation detector can be arranged in the flow path of the additional flow downstream from the environmental sensor.

In some embodiments, the radiation detector and the environmental sensor are mounted on a common circuit board. This is particularly advantageous if the radiation detector is a surface-mount device photodetector, e.g., a surface-mount photodiode.

In order to allow the additional flow to traverse the circuit board, the circuit board can comprise one or more through-holes configured to allow the additional flow to traverse the circuit board. In other embodiments, the flow path of the additional flow runs around at least one edge of the circuit board.

The particulate matter sensor device can be configured to thermally decouple the environmental sensor from at least one portion of the circuit board. This is particularly advantageous if the environmental sensor is configured to determine a temperature of the additional flow. In particular, the circuit board can be configured to thermally decouple a first portion of the circuit board on which the environmental sensor is mounted from a portion that is at a distance from the first portion. Many different measures can be taken in order to thermally decouple the environmental sensor from certain portions of the circuit board. Reference is made to DE 2017 106 413 U1, which describes such measures. For instance, the circuit board can have one or more slots between a first portion on which the environmental sensor is mounted and another portion that is at a distance from the first portion.

In some embodiments, the radiation detector and the environmental sensor are arranged on opposite sides of the circuit board. This may be advantageous depending on the availability of space for the environmental sensor, but it can also help in thermally decoupling the environmental sensor from certain portions of the circuit board and/or from the radiation detection. The additional flow then preferably first passes the environmental sensor on a first side of the circuit board, is then directed to the opposite side of the circuit board and there passes the radiation detector. In other embodiments, the radiation detector and the environmental sensor can be arranged on the same side of the circuit board.

The particulate matter sensor device can comprise a compensation device configured to read out the environmental sensor and to derive a compensated output parameter that is indicative of a parameter of a gas in the additional flow before said gas entered the particulate matter sensor device. In this manner a more accurate indication of an environmental parameter outside the particulate matter sensor device can be obtained. For instance, if the environmental sensor is configured to determine a temperature of the additional flow, the compensation device can be configured to receive information indicative of an amount of heat ingress into the environmental sensor and/or into the gas of the additional flow before it reaches the environmental sensor, and to compensate for the heat ingress. Such heat ingress can arise from heat dissipation at the radiation source, the radiation detector, the fan (if present), and/or any other electric or electronic devices in the particulate matter sensor device. In a simple embodiment, the compensation device can receive information about the dissipated electric power of at least one of the radiation source, the radiation detector, the fan etc., and can compensate for the resulting heat ingress, e.g., by employing an empirically determined lookup table that correlates dissipated power with an increase of measured temperature by the environmental sensor. In this manner, a more reliable indication of the temperature in the environment of the particulate matter sensor device can be obtained. Similar measures can be taken also for other environmental parameters. The compensation device can be integrated with the environmental sensor, in particular, with its control and readout circuitry, or it can be implemented separately.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1(a) shows a schematic longitudinal-sectional view of an embodiment of a particulate matter sensor device;

FIG. 1(b) shows, in schematic sectional top view, the embodiment of a particulate matter sensor device according to FIG. 1(a);

FIG. 2(a)-(c) show, in schematic cross-sectional view, embodiments of the flow channel;

DESCRIPTION OF PREFERRED EMBODIMENTS

Figure 3:
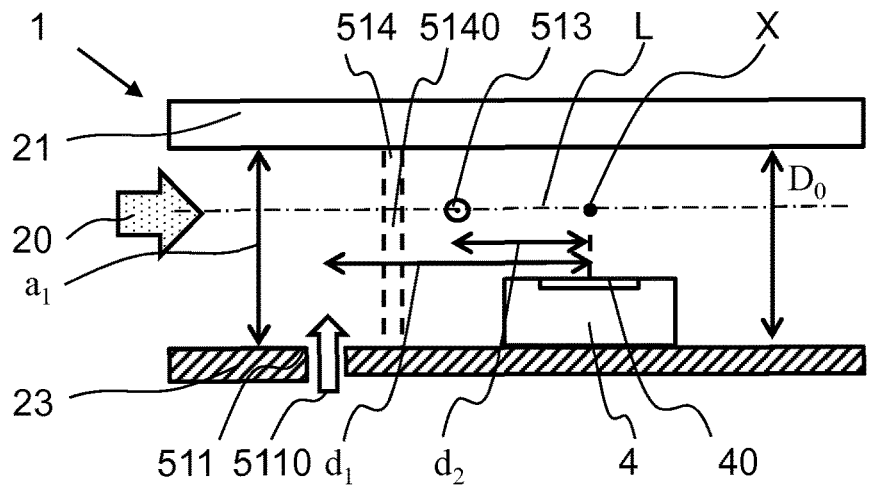
FIG. 3 shows a schematic longitudinal-sectional view of an embodiment of the particulate matter sensor device with additional flow.
Figure 4:
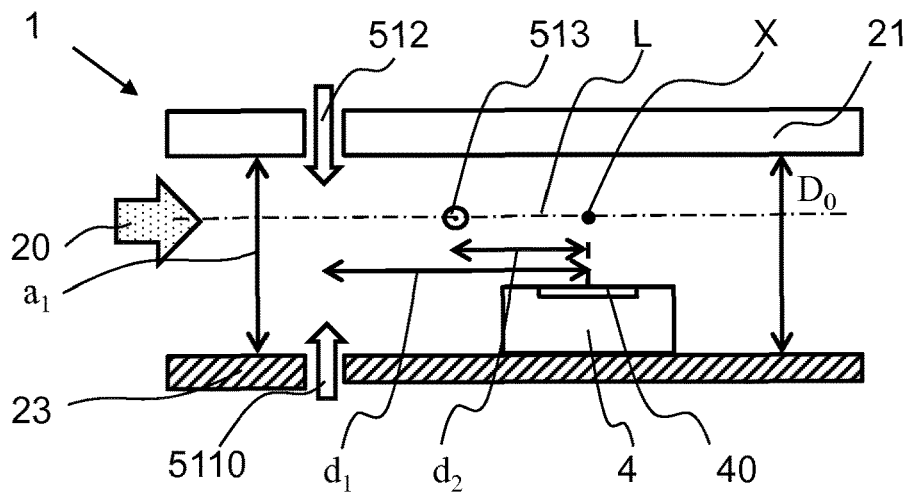
FIG. 4 shows a schematic longitudinal-sectional view of another embodiment of the particulate matter sensor device with additional flow.
Figure 5:
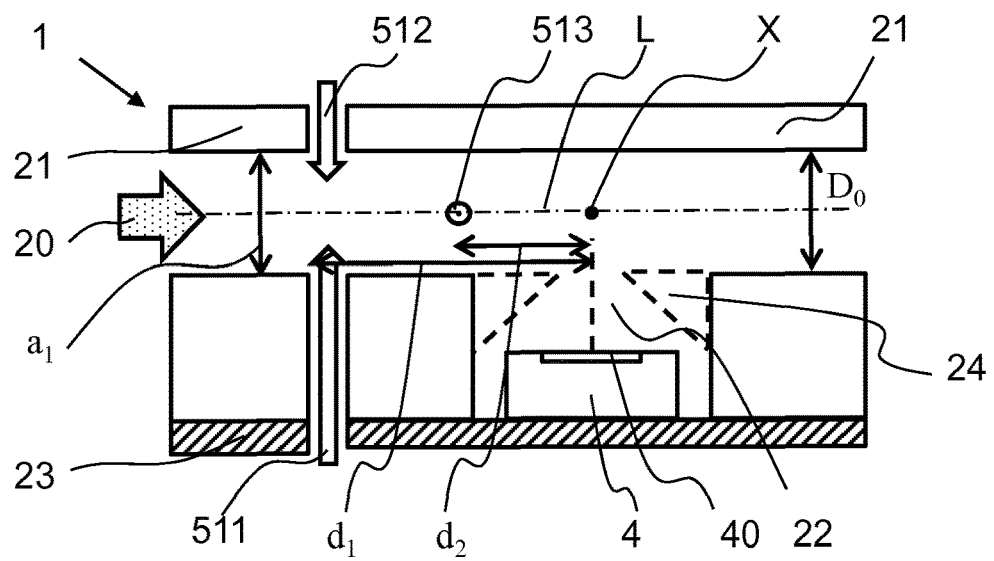
FIG. 5 shows a schematic longitudinal-sectional view of yet another embodiment of the particulate matter sensor device with additional flow.
Figure 6:
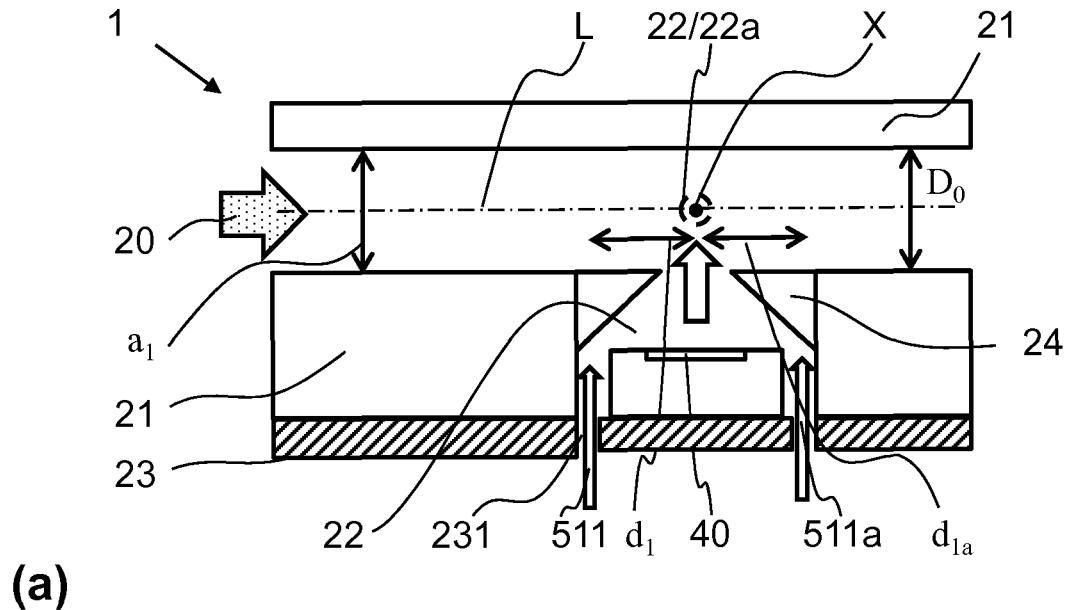
FIG. 6(a) shows a schematic longitudinal-sectional view of yet another embodiment of the particulate matter sensor device with additional flow.
FIG. 6(b) shows a schematic sectional top view of the embodiment of the particulate matter sensor device with additional flow according to FIG. 6(a)
Figure 6:
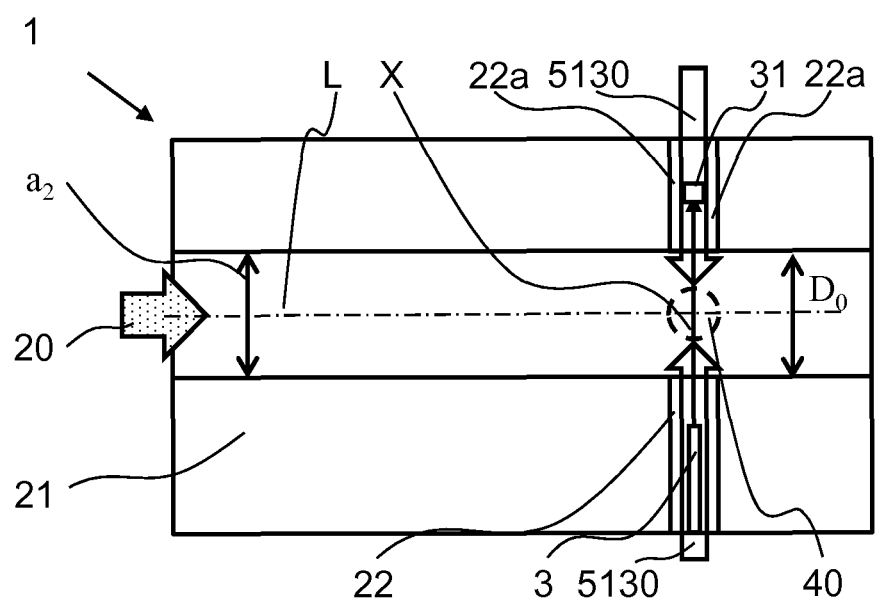
Figure 7:
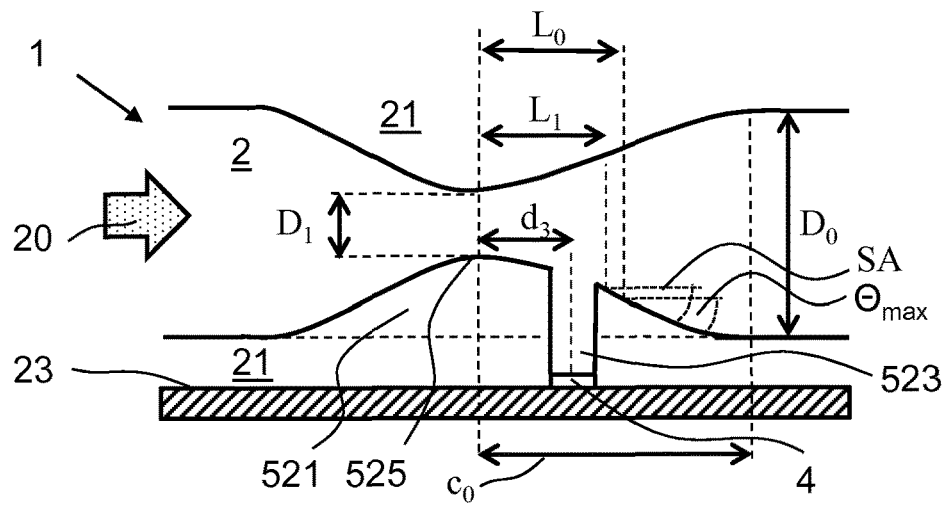
FIG. 7 shows a schematic longitudinal-sectional view of an embodiment of the particulate matter sensor device with a constriction.
Figure 8:
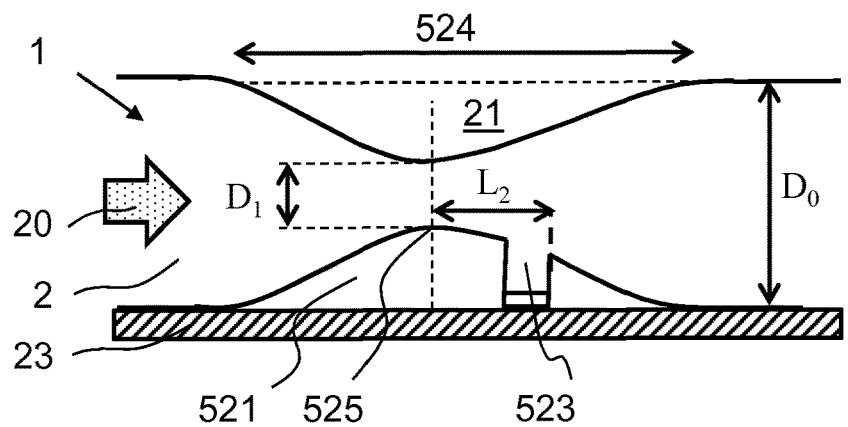
FIG. 8 shows a schematic longitudinal-sectional view of another embodiment of the particulate matter sensor device with a constriction.
Figure 9:
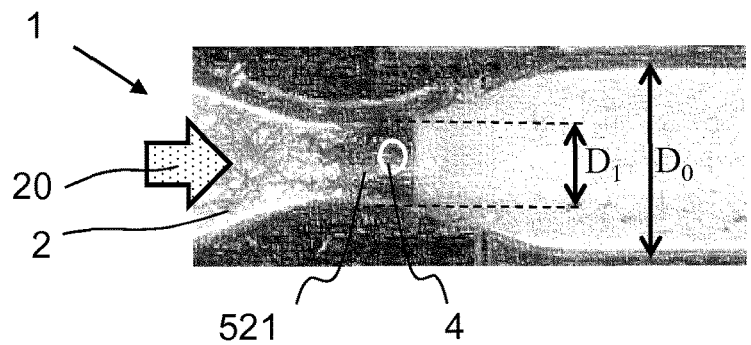
FIG. 9 shows, in a top view, a photograph of another embodiment of the particulate matter sensor device with a constriction.
Figure 10:
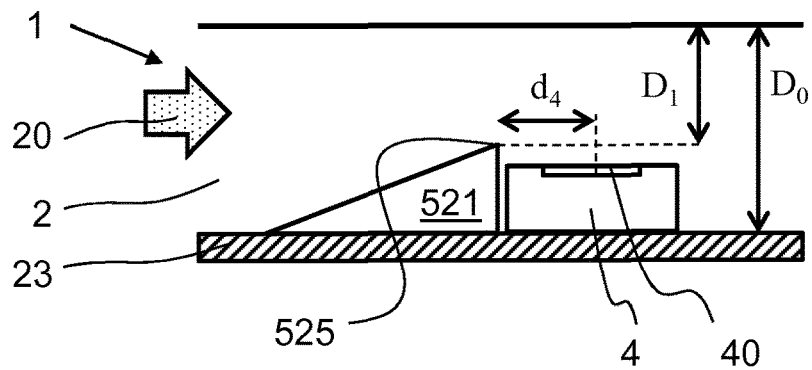
FIG. 10 shows, in a schematic lateral longitudinal-sectional view, yet another embodiment of the particulate matter sensor device with a constriction device.
Figure 11:
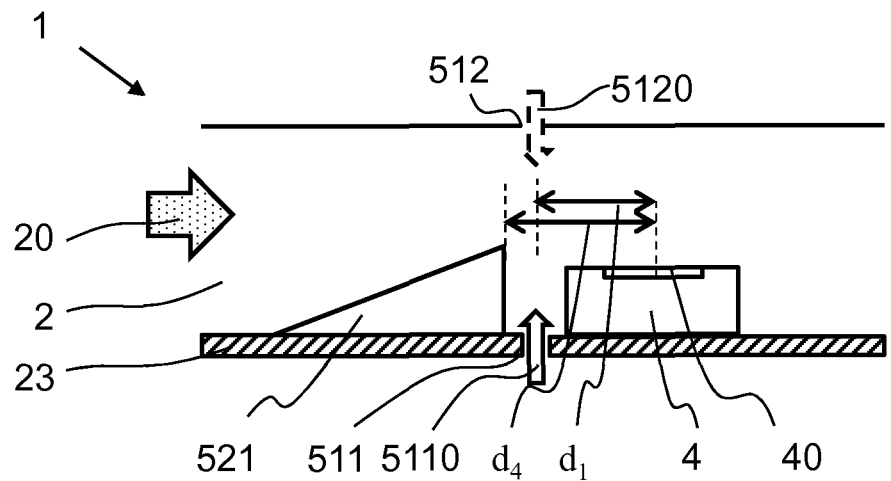
FIG. 11 shows a schematic lateral longitudinal-sectional view of a further embodiment of the particulate matter sensor device with a constriction and additional flow.
Figure 12:
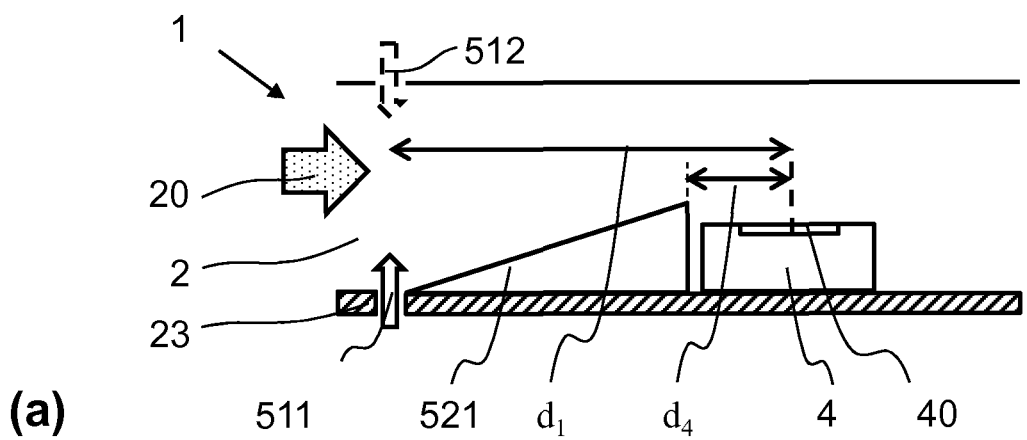
FIG. 12(a) shows a schematic longitudinal-sectional view of another embodiment of the particulate matter sensor device with a constriction and additional flow.
FIG. 12(b) shows a schematic sectional top view, of the embodiment of a particulate matter sensor device according to FIG. 12(a)
Figure 12:
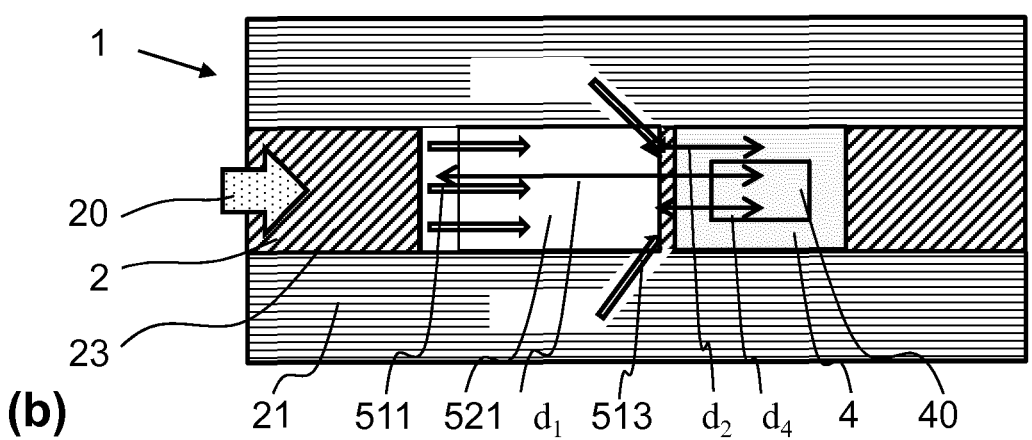

Preferred embodiments of the present invention are now described with reference to the figures.

In the context of the figures, a particulate matter sensor device 1 for ascertaining a particulate matter concentration in an aerosol sample is exemplarily described, wherein visible light is used as radiation.

FIG. 1(*a*) shows a schematic lateral longitudinal-sectional view of a first embodiment of a particulate matter sensor device 1. FIG. 1(*b*) shows this particulate matter sensor device 1 in schematic sectional top view. The device 1 comprises and enclosure 21 that delimits a flow channel 2 extending between an inlet 11 and an outlet 12 along a longitudinal axis L and having a diameter $D_0$. A flow 20 of an aerosol sample to be measured by the sensor device 1 is guided through the flow channel 2. A fan 220, i.e. a ventilation device is arranged in the flow channel 2 for controlling the flow 20.

A printed circuit board 23 is attached to the bottom of the enclosure 21.

A radiation detector 4 is accommodated in a first recess 22 in a bottom section of the enclosure 21 in flow channel 2. The detector 4 may be a surface-mount photo diode. The detector 4 is arranged on or in the printed circuit board 23. The photo diode 4 has a sensitive area 40 that is directed towards the channel 2 and that extends substantially along the longitudinal axis L such that the surface 40 is substantially flush with a wall of the enclosure delimiting the channel 2. This introduces the least resistance or disturbance to the aerosol flow 20.

As can be seen in FIG. 1*b*, a radiation source 3, here a laser, is arranged in a further first recess 22 of a lateral wall section provided by the enclosure 21. The radiation path X, here the laser light path, extends substantially perpendicularly to the longitudinal axis L of the channel 2. Moreover, the radiation path X is chosen such that is extends just above the sensitive area 40, preferably at a distance to the sensitive area by a fraction of $D_0$, wherein preferably, the radiation path X extents in the center of the channel 2. This increases the sensitivity of the sensor device 1 since the detector 4 is closer at the reaction zone where the radiation interacts with the particulate matter in the aerosol sample.

The laser device 3 emits the laser beam 32 through the flow channel 2, where the laser light interacts with the particulate matter in aerosol sample flow 20 which produces, for example, scattered light 30 that is detected by the detector 4. The laser beam fraction that does not interact is then guided into a horizontal recess 22*a* and onto the beam stopper 31.

Opposite the laser device 3, a further recess 22*a* is provided, at the bottom of which a beam stopper 31 is arranged for receiving the laser light that was not (or not enough) redirected or absorbed by the aerosol sample. Providing the beam stopper 31 in the recess 22*a* reduces stray or spurious light that may disturb the measurement. Additionally, the recess 22*a* may be curved or bent while a reflecting element is arranged in the curve or bend for guiding the radiation onto the stopper 31. Back-reflections from the stopper 31 are thereby reduced.

At an upstream distance $d_1$ from the sensitive area 40, a first additional flow opening 511, here a bottom inlet opening, is arranged in a bottom wall section of the enclosure 21. The line that feeds the bottom inlet 511 extends through a through-hole 231 in the printed circuit board 23 to the bottom inlet 511 and provides the bottom inlet 511 with gas such as to produce the first additional flow 5110, which here is a bottom additional flow.

At substantially the same upstream distance $d_1$ from the sensitive area 40, a second additional flow opening 512, here a top inlet opening, is arranged in a top wall section of the enclosure 21. The top flow inlet 512 is supplied with a gas such as to produce the second additional flow 5120, which here is a top additional flow.

The additional bottom and top flows 5110, 5120 are directed substantially at right angles with respect to the longitudinal axis L into the flow channel 2.

Two third flow openings 513, lateral flow openings, are provided in lateral wall sections of the enclosure 21. The lateral flow inlets 513 are arranged opposite one another and are supplied with a gas such as to produce the third additional flows 5130, which here are lateral additional flows.

Openings that are arranged opposite one another may be arranged directly opposite one another or may be offset in flow direction with respect to one another by a fraction of $D_0$.

As can be seen from FIG. 1*b*, the lateral openings 513 are angled with respect to the longitudinal axis L such that an angle between L and the extension of the final section of the supply line feeding the lateral inlet 513 is about 30° to 60°. This inclined injection of the lateral flow leads to less disturbance of the aerosol flow 20. It is also conceivable that the lateral flows 5130 are injected substantially at right angles with respect to L. Moreover, it is conceivable that any additional flow, such as the top and/or bottom flow(s) 5110, 5120 are injected in an inclined manner as explained with respect to the later flows 5130.

At least some or all the additional flow openings 511, 512, 513 may be provided with a filter element or may a have an associated filter element provided preferably upstream of the opening, the filter being, e.g. an air filter, in particular a HEPA filter, or a path filter for creating a filtered additional flow. Moreover, at least some or all the additional flows 5110, 5120, 5130 may be created in that the flow 20 creates an under pressure at the respective inlet 511, 512, and 513, respectively.

The device 1 is further equipped with integrated circuitry 60 and/or a microprocessor 6, here shown as integrated to the detector 4. Microprocessor(s) 6 and integrated circuits 60 may be arranged, however, on or in other elements such as the radiation source 3 of the fan 220. The device 1 is configured for carrying out a measurement under control of the integrated circuitry 60 and/or a microprocessor 6 and by means of the radiation source 3 and the detector 4.

The sensor device 1 may be a PM1.0 or a PM2.5 sensor, i.e. it may measure particles that have a size of 1 micrometer and 2.5 micrometers, respectively, or smaller or it may be a PM10 device that measures particulate matter in an aerosol sample with particle sizes equal to or less than 10 micrometers.

The additional flows 5110, 5120, 5130 modify the flow 20 such that precipitation of particulate matter onto the radiation detector 4 and/or the radiation source 3 and/or onto the wall surface in close proximity to radiation source and detector is reduced.

An embodiment of the resulting modified flow is schematically illustrated by the three arrows B in the center of FIG. 1*a* and FIG. 1*b*. Here, peripheral flow of lower aerosol density (indicated by the thin arrows B) reduces, in comparison with a center flow (indicated by the thick center arrow) precipitation of particulate matter onto the radiation detector 4 and/or the radiation source 3 and/onto the channel wall section surface in close proximity to radiation source 3 and detector 4. Here, only a fraction of 10% or less of the flowing particulate matter in the centre of the flow channel close to the longitudinal axis 2 are hit by the radiation. The density of the aerosol in the center of the flow channel, where the measurement takes place, remains essentially unchanged and only its flow velocity may increase as compared to the inlet. If the additional flow effects the measurement, this effect is compensated for in the calibration and/or modelling of the particulate matter sensor device.

The additional flow openings 511, 512, 513 may be shaped and configured such that additional flows 5110, 5120, 5130 together have a flow that is 1% to 30% (preferably 1% to 25%, more preferably 1% to 20%) of the aerosol sample flow 20 before any of said additional flows 5110, 5120, 5130.

Preferable, the additional flow is limited by a dimension in the line that feeds the additional flow and not by the filter to be more robust against increased clogging of the filter and to increase longer term stability. The feed line includes the opening 231 in FIG. 13.

Typical shapes of the additional flow openings 511, 512, 513 are rectangular slits or round holes with a typical width/diameter in a range of from 0.1 millimeters to 1 millimeter. Preferably, slit-like openings extend over a full width of the channel they are provided in. In some embodiments, the slit-like openings may be arranged on all channel walls, in some embodiments may be oriented along the flow direction, in some embodiments may be arranged at right or other angles thereto. In some embodiments, slit-like openings may be provided such that a circumferential opening around the entire channel is given, the circumferential opening extending either in a closed or in a spiral manner around the channel.

FIGS. 2(*a*)-(*c*) show, in schematic cross-sectional view, different embodiments of the flow channel 2 and an embodiment of the position of the radiation detector 4 and the size of the detection area 40. In this embodiment, the width of the detection area 40 essentially corresponds to the width $a_2$ of the flow channel 2. Different cross-sectional shapes with area A are shown.

FIG. 2(*a*) shows a rectilinear cross-section with sides $a_1$ and $a_2$. Here, the two corners of the top wall section 215 are rounded. Moreover, lateral wall sections 216, top wall section 215, and bottom wall section 217 are indicated.

FIG. 2(*b*) shows a triangular cross-section with base $a_2$ and sides $a_1$. The triangle may be an isosceles or an equilateral triangle. Moreover, lateral wall sections 216 and bottom wall section 217 are indicated. Here, the angle between the two lateral wall sections 216 is rounded.

FIG. 2(*c*) shows a round cross-section with axes $a_1$ and $a_2$. The axes $a_1$ and $a_2$ may have the same length and the shape may preferably be circular, the axes $a_1$ and $a_2$ may, however, also have different lengths and the shape may preferably be elliptical. Moreover, lateral wall sections 216, top wall section 215, and bottom wall section 217 are indicated. Here, the shape of the lower half of the round cross-section is modified at the location of the radiation detector 4 to allow for a wide access angle to the detection area 40.

FIG. 3 shows a schematic lateral longitudinal-sectional view of a further embodiment of the particulate matter sensor device 1 with additional flows. Differences to the previous embodiment according to FIG. 1 are described. According to FIG. 3, the printed circuit board 23 delimits the bottom section of the flow channel 2. The circuit board 23 is arranged in the enclosure 21 or the enclosure 21 is fitted onto the circuit board 23. In this embodiment, the detector 4 is not arranged in a recess in the enclosure 21 but protrudes into the channel 2 from the circuit board 23 on which it is attached. Accordingly, the average flow channel diameter $D_0$ may be larger in this embodiment and may be constricted in the region of the detector 4. This constriction may modify the flow 20 such as to produce less precipitation of particulate matter. Alternatively, the detector 4 may be arranged in the circuit board 23 to be flush with the average channel wall which would cause less flow resistance to the flow 20.

In this embodiment, bottom additional flow 5110 and lateral additional flows 5130 are provided.

In this embodiment, also a slit-like inlet 514 may be provided for providing a sheet-like additional flow 5140. Here, the sheet-like additional flow is a lateral flow that produces a sheath for protecting the detector 4. Particularly preferred are slit-like flow openings on the wall section on which the element that shall be protected, i.e. the detector 4 and/or the source 3, are arranged such that this element is covered by a sheet-like flow from particulate matter deposition.

FIG. 4 shows a schematic lateral longitudinal-sectional view of another embodiment of the particulate matter sensor device 1 with additional flow. In this embodiment, a top additional flow 5120 is introduced into the flow channel 2, when in use, through a second additional flow inlet 512.

FIG. 5 shows a schematic lateral longitudinal-sectional view of yet another embodiment of the particulate matter sensor device 1 with additional flow. This embodiment is like the embodiment according to FIG. 1 with the difference that the detector 4 is provided in a deep first recess 22. Accordingly, the sensitive surface 40 is no longer flush with the average channel bottom wall but offset with respect to the channel centre into the recess 22. The entrance region into the recess 22 may be constricted by additional enclosure elements 24 that may be integrated to the enclosure 21 or that may be extra elements fastened to the entrance region. The constriction 24 of the entrance region is such that the radiation may exit the recess 22 without disturbance while the penetration of particulate matter into the recess 22 is reduced due to the constriction.

As in the embodiment according to FIG. 1, top, bottom, and lateral flow openings 511, 512, 513 are provided according to FIG. 3 for establishing top, bottom, and lateral additional flows 5110, 5120, 5130 into the flow channel 2 for protecting the detector 4 and/or the source 3. Again, some of these additional flows may be dispensed with, e.g. only one additional flow opening may be provided, e.g. a bottom flow inlet 511.

A preferred embodiment of the present invention is now described with reference to FIGS. 6 and 7.

FIG. 6(*a*) shows a schematic lateral longitudinal-sectional view of the particulate matter sensor device 1 with additional flow according to this embodiment. FIG. 6(*b*) shows a schematic sectional top view this embodiment.

As in the embodiment according to FIG. 5, the detector 4 is arranged in a first recess 22, the recess entrance region is constricted by additional enclosure elements 24, wherein, in the first recess 22, are provided one or more bottom additional flow openings 511, 511*a* that establish a gas flow channel through the circuit board 23 (through the throughholes 231) into the channel 2. Preferably, the constricted region from which flow 5110 exits into the channel 2 is just below the radiation path X.

Additionally, as seen in FIG. 6(*b*), the first recesses 22 and 22*a*, in which the laser 3 and beam stopper 31, respectively, are accommodated, act as an inlet through which a lateral additional flow 5130 is established. This protects the source 3 particularly efficiently from deposition of particulate matter as particulate matter is much more unlikely to enter one of the recesses 22, 22a that act as additional flow inlets. As outlined above, the additional flow openings create a flow into or from the flow channel 2 that modify the aerosol flow 20 and that redirect the particulate matter onto trajectories that avoid deposition on detector 4 and/or source 3 or that dilute the sample locally. Instead of creating extra flow through introduction or withdrawal of gas into or from the channel, a structural element may be place in the particulate matter trajectory such that the particulate matter is diverted from the object to be protected. This is achieved a constriction that may be a bump in the channel wall or an additional element placed in the channel 2 and that basically acts like a ramp.

FIG. 7 shows a schematic lateral longitudinal-sectional view of a preferred embodiment of the particulate matter sensor device 1 with a constriction device 52. In FIG. 7, the enclosure 21 forms the flow channel 2, whilst the channel 2 is constricted in the middle region of the FIG. 7 by the arrangement of the channel walls provided by the enclosure 21.

FIG. 8 shows a schematic lateral longitudinal-sectional view of another embodiment of the particulate matter sensor device 1 with a constriction device 52, wherein the constriction 52 is arranged, as an additional element, on the printed circuit board 23.

In both cases, the constriction 521 extends, in flow direction, over a constriction area 524 and elevates, in a smooth manner, from the channel wall at the location where the channel diameter is $D_0$ to the axis of the channel 2 until it reaches, in flow direction, its constriction maximum 525, i.e. were the minimum clear width $D_1$ of the channel 2 is located; thereafter the constriction 521 falls back until the channel diameter has reached its original diameter $D_0$. The constriction 521 shown here is a smooth bump that resembles a Gaussian curve. The constriction 521 may also have a downstream half width $c_0$ which is smaller than the upstream half width. In other words, the curve may have a positive skew. It is, however, also conceivable that the curve has a negative skew or is symmetrical.

At the downstream distance $d_3$ of the constriction maximum 525 the constriction 521 is provided with a recess 523. The recess 523 has basically the same function as the first recess 22 described in the context of the previous embodiments. The recess 523 extends, in at substantially right angles to the longitudinal direction L, down to the printed circuit board 23. It is, however, generally conceivable that the recess 523 is less deep and/or inclined or curved. The recess 523 accommodates the detector 4, which, as shown in the FIGS. 7, 8, is arranged on the printed circuit board 23.

In the embodiment shown in FIG. 7, the curvature of the constriction 521 is such that, at a downstream distance $L_1$ of the constriction maximum 525, a stall angle SA is reached. Here, $L_1$ is larger than $d_3$ in such a manner that the stall angle is downstream of the recess 523. Accordingly, the flow 20 stalls only behind the recess 523. A maximum angle $\Theta_{max}$ is then reached at a downstream distance of $L_0$ from the constriction maximum 525. Here, $L_1$ is smaller than $L_0$.

The constriction situation according to FIGS. 7/8 shows, for some embodiments and in relation to the constriction and channel 2, true relative relations between constriction 521 and channel 2 dimensions.

FIG. 9 shows, in a top view, a photograph of another embodiment of the particulate matter sensor device 1 with a constriction 521. The detector 4 is arranged downstream of the constriction maximum 525 and the constriction 521 constricts the channel diameter $D_0$ to the channel diameter $D_1$. In this embodiment, the constriction 521 is extending circumferentially around the channel 2. Geometrical relations of different parts of the objects shown in FIG. 9 may be measured from the photograph.

FIG. 10 shows a schematic lateral longitudinal-sectional view of yet another embodiment of the particulate matter sensor device 1 with a constriction device 521. In this embodiment, the constriction device 521 is a ramp-like element that is placed upstream of the detector 4. Preferably, as indicated in the figure, the ramp 521 has a height that is bigger than the height of the detector 4, i.e. the tip of the ramp 521 (which may be designated as the constriction maximum 525) is higher than the sensitive area 40. As indicated, the channel diameter $D_0$ is larger than the constricted clear minimum width $D_1$ of the flow channel 2. An upstream distance $d_4$ between the tip of the constriction and the sensitive area may be 1 millimeter to 5 millimeters. Both, the ramp 521 and the detector 4 may be both arranged on the circuit board 23. It is to be understood, that the ramp 521 may have a linear slope or may follow an at least partly curved slope (see for example FIG. 8).

FIG. 11 shows a schematic lateral longitudinal-sectional view of a further embodiment of the particulate matter sensor device 1 with a constriction 521 and additional flow. This embodiment is essentially the same as the embodiment according to FIG. 10, wherein, additionally, a flow opening 511 is arranged between the ramp 521 and the detector 4. Preferably, this flow opening is a bottom flow inlet as outlined above. Additionally, a top flow inlet 512 may be provided for introduction a top additional flow 5120. The top additional flow inlet 512 may be arranged opposite the bottom additional flow inlet 511. The upstream distance $d_4$ between the ramp tip 525 and the sensitive area 40 may be in range of from 2 millimeters to 25 millimeters. The upstream distance $d_1$ between the bottom additional inlet 511 and the sensitive area 40 may be in range of from 1 millimeter to 5 millimeters.

FIG. 12(*a*) shows a schematic lateral longitudinal-sectional view of another embodiment of the particulate matter sensor device 1 with a constriction and additional flow. FIG. 12(*b*) shows a schematic sectional top view of this embodiment. Like in the embodiment according to FIG. 11, a ramp constriction device 521 a bottom additional flow 511 are arrange in the flow channel 2. In this case, however, the bottom additional flow inlet 511 is not between ramp 521 and detector 4 but the ramp 521 is arranged between the bottom additional inlet 511 and the detector 4. In other words, the bottom additional flow inlet 511 arranged upstream of the ramp 521 (not downstream as in FIG. 11). The upstream distance $d_4$ between the ramp tip 525 and the sensitive area 40 may be in range of from 1 millimeter to 5 millimeters. The upstream distance $d_1$ between the bottom additional inlet 511 and the sensitive area 40 may be in range of from 2 millimeters to 25 millimeters or more.

FIG. 13 shows an exploded perspective top view of an embodiment of a partly assembled particulate matter sensor device 1 with from top to bottom: second enclosure 212 (shown upside down), first enclosure 211, circuit board 23, filter 213, and cover 214.

The first and second enclosures 211, 212 together form the enclosure 21. The second enclosure 212 forms the top part that delimits the top half of the flow channel 2. The first enclosure 211 forms the bottom part that delimits the bottom half of the flow channel 2. In this embodiment, the flow channel 2 is essentially U shaped with a substantially rectangular cross-sectional shape. The detector 4 is directed towards the channel 2 and is arranged in a first recess 22b in the first enclosure 211 (see FIG. 14) while being attached to the printed circuit board 23. The detector 4 is arranged just downstream of the first U bend in flow direction. The laser device 3 is arranged to emit laser light just above the sensitive area 40 of the detector 4. A connector 232 provides electrical connections for powering, controlling and reading out the particulate matter sensor device 1.

The aerosol sample flow 20 is drawn into the channel 2 through the inlet 11 and sucked through the flow channel 2, via the centrifugal fan 220 out through the outlet 12.

In the cover 214 there is a plurality of additional inlets 13 arranged at regular distances around a peripheral wall of the cover 214 with a solid cover plate. Ambient air or another aerosol or gas is sucked into the device 1 though these additional inlets 13 and is passed through the filter 213 and then through the through-opening 231 to be guided through the additional flow openings 511 and 513 into channel 2 for establishing a filtered additional flow for modifying the aerosol sample flow 20 as outlined above.

In some embodiments, an optional environmental sensor 7 is arranged in the flow path of the additional flow downstream from filter 213. The environmental sensor 7 determines an environmental parameter such as temperature, humidity or a concentration of an analyte in the filtered additional flow. By arranging the environmental sensor 7 downstream from filter 213, the environmental sensor 7 is well protected from contaminations by particulate matter, such particulate matter being filtered out by filter 213 before it can reach the environmental sensor 7.

The environmental sensor 7 may comprise or be connected to a compensation device that reads out the environmental sensor and derives a compensated output parameter based on the sensor signals of the environmental sensor. The output parameter derived by the compensation device may be indicative of a property that the gas of the filtered flow had before it entered the particulate matter sensor device 1, such as the temperature, the humidity or the concentration of one or more analytes in the environment of the particulate matter sensor device 1. To this end, the compensation device can compensate for expected differences between a parameter as measured by the environmental sensor and the actual value of this parameter outside the particulate matter sensor device 1. For instance, if the environmental sensor is a temperature sensor, the compensation device may compensate for an expected temperature difference between the inside and the outside of housing 21 due to heat dissipation by the laser device 3, the radiation detector 4 and the fan 220. In this manner, a more accurate indication of the measured parameter in the environment of the particulate matter sensor device 1 is obtained.

Figure 13:
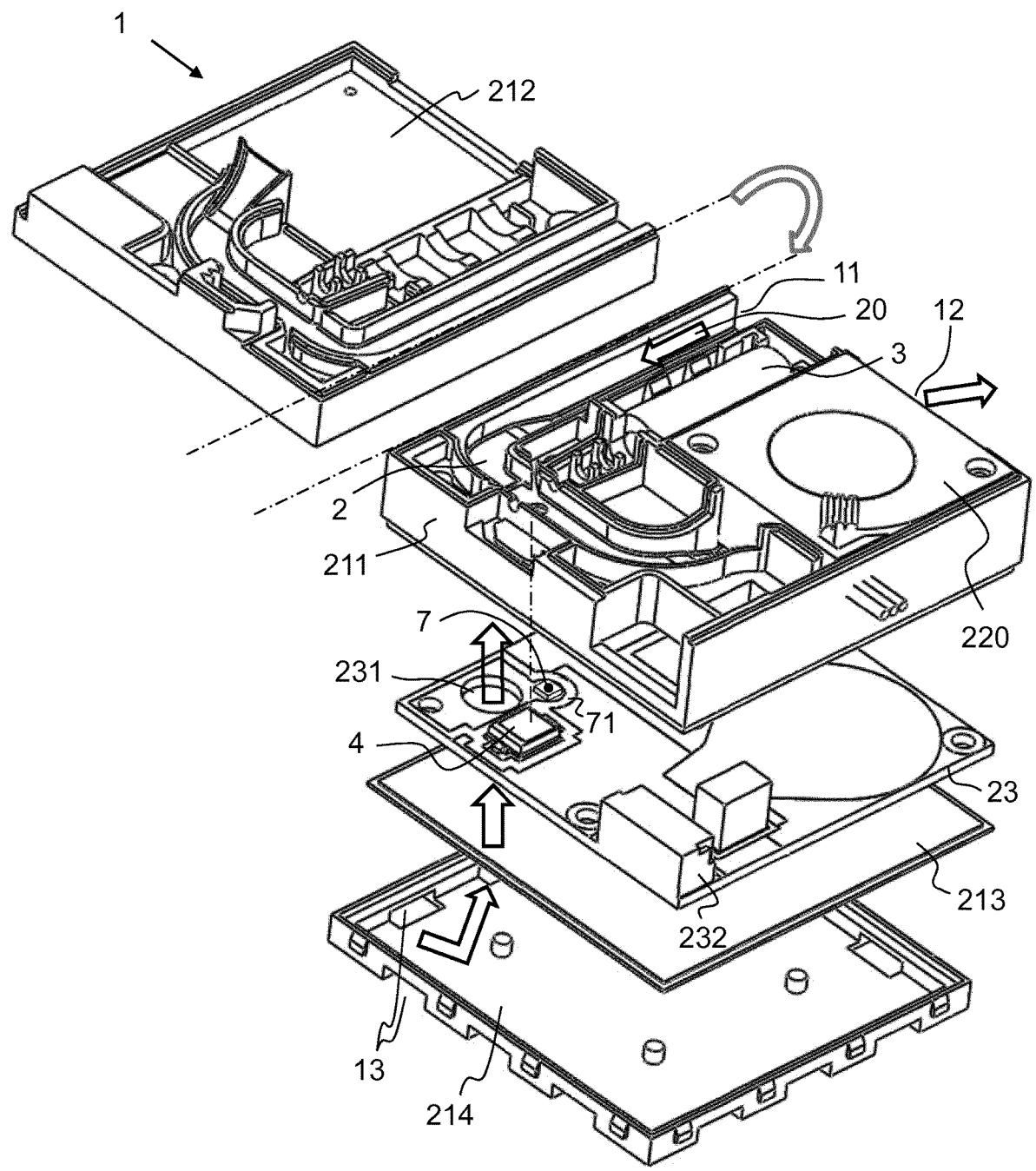
FIG. 13 shows an exploded perspective view of an embodiment of a partly assembled particulate matter sensor device with from top to bottom: second enclosure (shown upside down), first enclosure, circuit board, filter and cover.

In the embodiment of FIG. 13, the environmental sensor 7 is mounted on the same circuit board 23 as the detector 4. In fact, it is mounted on the same side of the circuit board 23 as the detector 4, being laterally separated from the detector 4 only by an intermediate wall portion 71. A corresponding wall portion is also present in the bottom of first enclosure 211 so as to provide a seal between the detector 4 and the flow path of the filtered flow, which passes through through-opening 231 and past environmental sensor 7. In other embodiments, the environmental sensor 7 may be arranged on the opposite side of the circuit board 23 as compared to the detector 4.

Figure 14:
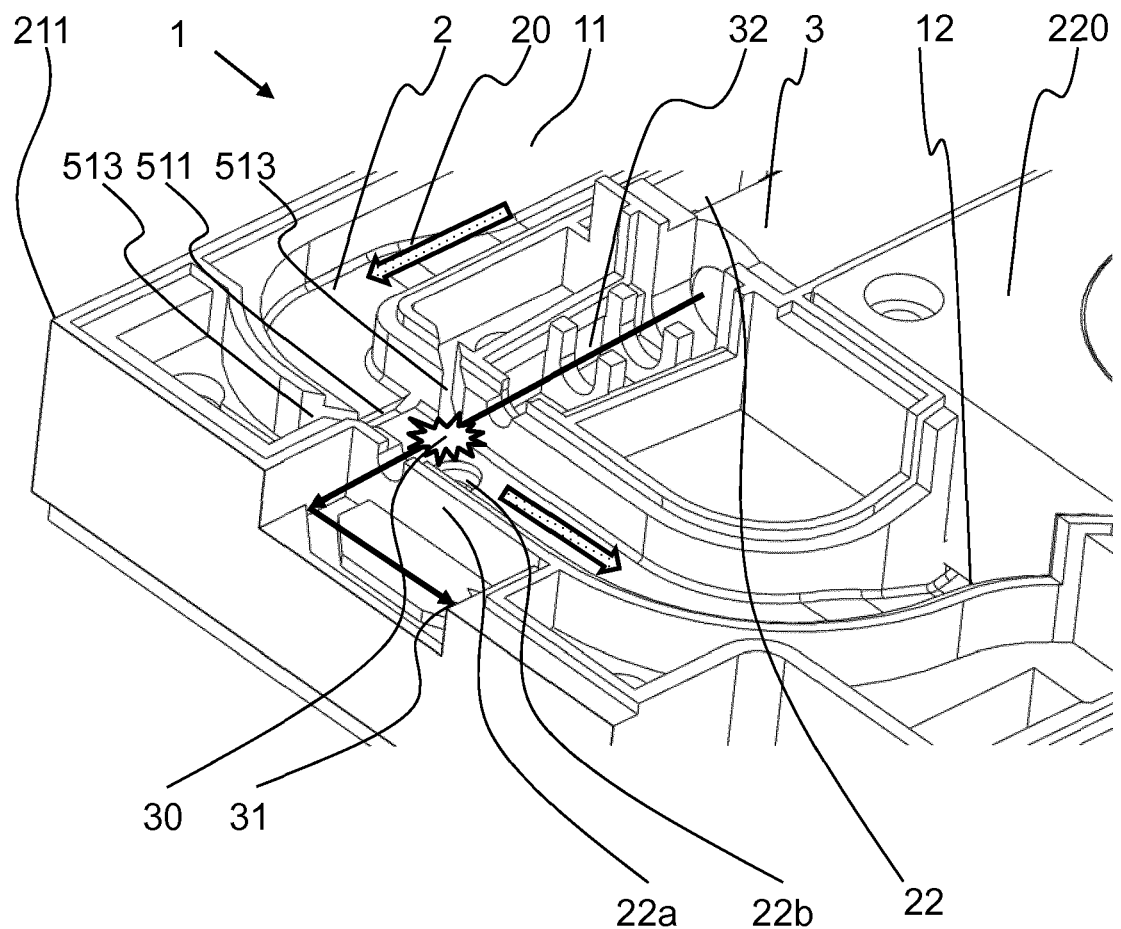
FIG. 14 shows an enlarged detail view of the first enclosure of the particulate matter sensor device according to FIG. 13.

FIG. 14 shows an enlarged detail view of the first enclosure 211 of the particulate matter sensor device 1 according to FIG. 13. The laser device 3 emits the laser beam 32 through the flow channel 2, where the laser light interacts with the particulate matter in aerosol sample flow 20 which produces, for example, scattered light 30 that is detected by the detector 4. The laser beam fraction that does not interact is then guided into a horizontal recess 22a and onto the beam stopper 31. In this embodiment, it is shown that the beam stopper 31 may be arranged offset to the original beam path X. In other words, the laser light follows, after exiting the channel 2, an L-shaped path, wherein in the knee of the L-shape, the light is reflected onto the beam stopper 31. This idea may be integrated in any embodiment, as it helps to reduce disturbing stray light onto the detector 4.

The detector 4 is arranged in another the first recess 22a that extends vertically. Both first recesses 22a extend substantially at right angles with the flow direction in the interaction area between laser beam 32 and particulate matter in sample flow 20.

Closely upstream of the detector 4 are arranged the additional flow openings 511 and 513 for modifying the flow 20 such that less particulate matter is deposited onto the detector 4 and/or der source 3.

It is to be understood that the above-mentioned embodiments are only exemplary. The different ideas of constriction, additional flow opening, and or recessing sensitive items into recesses may be combined to create further embodiments.

All or some of the additional flows may be generated in a suction-based manner, i.e. the flow channel pressure situation establishes and maintains the additional flow situation. On the other hand, all or some of the additional flows may be generated by pushing gas into the additional channels associated with the inlet openings or by fan or ventilation means arranged in said additional channels.

Also, for some embodiments, the flow openings 511, 512, 513, and/or 514 may be outlets, i.e. they draw gas from the channel 2. The basic principle, that, for example, a bottom additional flow inlet may divert the aerosol flow 20 upwards to the top wall section (and thereby particulate matter away from the bottom) may be achieve by a top additional opening that is an outlet and that draws gas from the gas flow.

Figure 15:
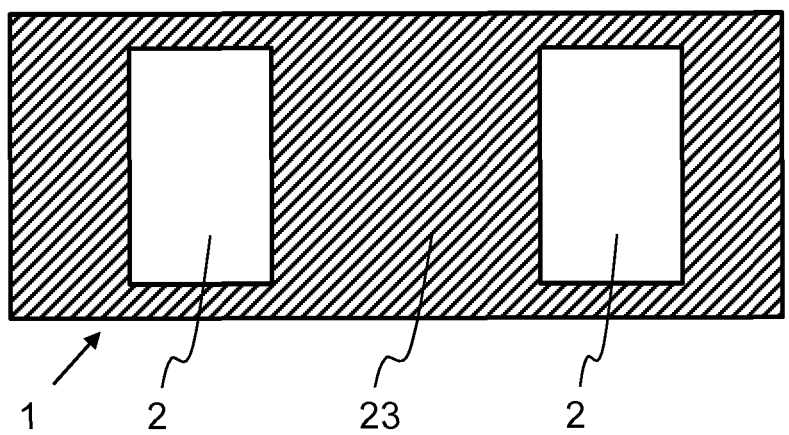
FIG. 15 shows a schematic top view of an embodiment of the particulate matter sensor device with two flow channels.

FIG. 15 shows a schematic top view of an embodiment of the particulate matter sensor device, wherein the particulate matter sensor device 1 comprises two flow channels 2 that extend separately from one another. Here, the particulate matter device comprises two radiation sources and two radiation detectors (not shown), wherein one radiation source and one radiation detector is arranged in each of the two flow channels. The enclosure 21 is arranged and configured to receive or for being connected with the circuit board 23. The two radiation detectors are mounted on the same circuit board 23.

In some embodiments, the board 23 is attached to the enclosure 21 in such a manner that the board 23 delimits at least parts of the channel 2.

The two channels may be used for detecting and/or characterising particulate matter of an aerosol sample or of two different aerosol samples, e.g. indoor and outdoor air samples. Alternatively or additionally, the two channels may each be especially arranged and configured for detecting and/or characterising particular particulate matter sizes such as PM10, PM2.5 or PM1.0 and/or particular types of dust such as heavy dust, settling dust or suspended atmospheric dust.

Figure 16:
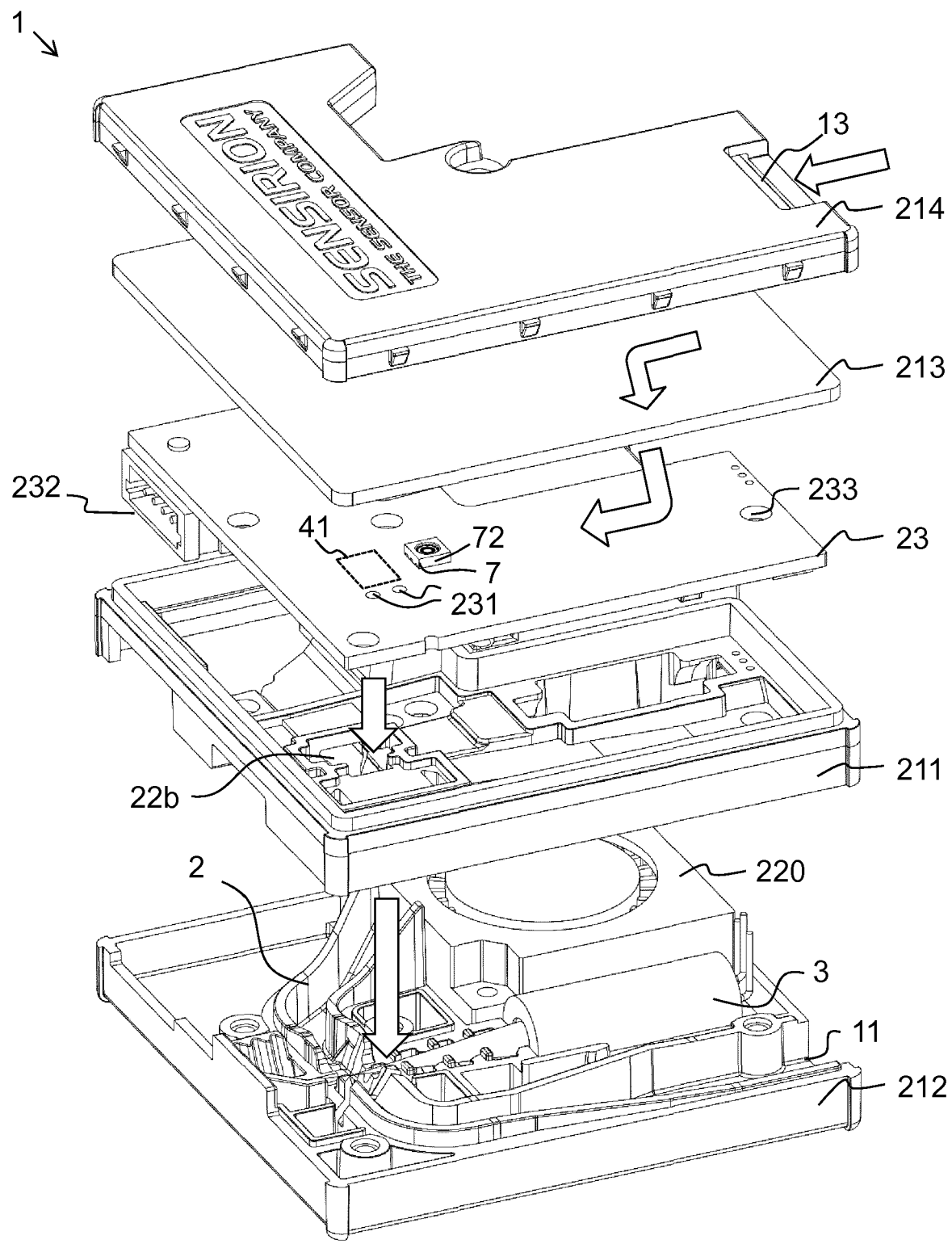
FIG. 16 shows an exploded perspective view of a further embodiment of a partly assembled particulate matter sensor device.

FIG. 16 illustrates a further embodiment of a particulate matter sensor device 1. As in the embodiment of FIG. 13, the sensor device comprises, from bottom to top, a second enclosure 212, a first enclosure 211, a circuit board 23, a filter 213 and a cover 214. These components are mounted to one another with the aid of several screws (not shown in FIG. 16) passing, inter alia, through through-holes 233 of circuit board 23. A connector 232 is mounted on the bottom of circuit board 23.

As in the embodiment of FIG. 13, a roughly U-shaped flow channel 2 is delimited by the first and second enclosures 211, 212. An aerosol sample is aspirated through an inlet 11 into the flow channel 2 by a fan 220. A laser device 3 emits laser light that crosses the flow channel 2 horizontally at a right angle to the flow direction. Laser light is scattered by the aerosol sample. Vertically above the flow channel, a photodetector (not visible in FIG. 16) is arranged in a recess 22b of the first enclosure 211 for detecting scattered light. The photodetector is mounted on the bottom side of circuit board 23 approximately in the region of the dotted rectangle 41 in FIG. 16.

In order to reduce deposition of particulate matter onto the photodetector, an additional gas flow is created. To this end, an additional inlet 13 is provided in cover 214, allowing gas to enter the inside of cover 214 and to pass through sheet-like filter 213, thereby creating a filtered flow. The filtered flow passes along the top of circuit board 23 and reaches the bottom of circuit board 23 through additional through-holes 231 in circuit board 23. In this connection, it is to be noted that the additional through-holes 231 are the only openings in circuit board 23 that allow the filtered flow to pass through, since all other through-holes 233 are sealed between enclosures 211, 212 and cover 214 by the screws. Once the filtered flow has reached the bottom of circuit board 23, it passes vertically through recess 22b past the photodetector (not visible in FIG. 16) before finally entering flow channel 2. By disposing the photodetector in the flow path of the filtered flow, the photodetector is protected from excessive contamination with particulate matter.

An environmental sensor 7 is mounted on circuit board 23 on the opposite side of the photodetector. As in the embodiment of FIG. 13, the environmental sensor is configured for determining an environmental parameter of the filtered flow, such as temperature, humidity or a concentration of an analyte. As in the embodiment of FIG. 13, the environmental sensor is well protected from unwanted contamination with particulate matter by being arranged in the flow path of the filtered flow behind filter 213. By mounting the environmental sensor 7 on the opposite side of the circuit board from the photodetector, thermal coupling between the photodetector and the environmental sensor 7 is reduced.

The environmental sensor 7 comprises an integrated compensation device 72. The compensation device 72 derives an output parameter that is indicative of a property that the gas of the filtered flow had before it entered the particulate matter sensor device 1, i.e., an environmental parameter, by taking into account any expected differences between the conditions outside and inside the housing of the particulate matter sensor device.

It is to be understood that the above-mentioned embodiments are only exemplary. In all embodiments, the particulate matter sensor device may comprise one or more additional sensors, such as temperature, humidity, gas and/or gas flow sensors, which does not necessarily need to be disposed in the flow path of the filtered flow.

The invention claimed is:

1. A particulate matter sensor device for detecting or characterizing particulate matter in a flow of an aerosol sample guided through the particulate matter sensor device, comprising:

an enclosure, the enclosure comprising a flow inlet and a flow outlet and defining a flow channel for guiding the flow of the aerosol sample through the particulate matter sensor device from the flow inlet to the flow outlet;

a radiation source arranged and configured to emit radiation into the flow channel for interaction of the radiation with at least some of the particulate matter in the flow of the aerosol sample;

a radiation detector arranged and configured to detect at least part of said radiation after interaction with the particulate matter;

a circuit board, wherein the radiation detector is mounted on the circuit board; and a flow modifying device configured to at least locally modify the flow of the aerosol sample, the flow modifying device comprising a constriction in or of the flow channel, the constriction constricting the flow channel in a continuous manner to direct at least part of the flow of the aerosol sample away from the radiation detector or the radiation source, and an additional flow opening for creating an additional flow into the flow channel, wherein the additional flow opening is configured to create the additional flow in such a manner that the additional flow overflows the radiation detector or the radiation source after the additional flow has entered the flow channel, thereby sheathing the radiation detector or the radiation source.

2. The particulate matter sensor device according to claim 1, wherein the additional flow opening is arranged at a first distance of less than 8 millimetres upstream of the radiation detector or the radiation source.

3. The particulate matter sensor device according to claim 2, wherein the constriction extends over a constriction region and defines a constriction maximum, and wherein the additional flow opening is arranged upstream of the constriction maximum.

4. The particulate matter sensor device according to claim 1, wherein the additional flow opening is slit-like and extends in circumferential direction with respect to the cross-section of the flow channel.

5. The particulate matter sensor device according to claim 1, comprising a filter, the filter being associated with the additional flow opening such that the additional flow is a filtered flow.

6. The particulate matter sensor device according to claim 1, comprising a secondary inlet that is separate from the flow inlet, wherein the additional flow opening is supplied by a gas drawn into the particulate matter sensor device from the secondary inlet.

7. The particulate matter sensor device according to claim 1, wherein the particulate matter sensor device is configured such that the additional flow through the additional flow opening is suction based.

8. The particulate matter sensor device according to claim 1, wherein the circuit board has at least one through-hole, and wherein the particulate matter sensor device is configured such that the at least one additional flow traverses the circuit board through the at least one through-hole and overflows the radiation detector after the additional flow has traversed the circuit board.

9. The particulate matter sensor device according to claim 1, wherein the flow modifying device is configured for introducing into said flow channel said additional flow such that a magnitude of said additional flow, in total, equals to or is less than 30 percent of a magnitude of the flow of the aerosol sample through the flow channel upstream of said flow modifying device.

10. The particulate matter sensor device according to claim 1, wherein the constriction extends over a constriction region and defines a constriction maximum, and wherein the constriction maximum is located at a distance of less than 5 millimeters upstream of the radiation detector or the radiation source.

11. The particulate matter sensor device according to claim 1, wherein the constriction extends over a constriction region and defines a constriction maximum, and wherein said constriction constricts the flow channel such that a ratio of a constricted clear minimum width at the constriction maximum and an average flow channel diameter is in a range of from 0.2 to 0.95.

12. The particulate matter sensor device according to claim 1, wherein the constriction extends over a constriction region and defines a constriction maximum, and wherein a distance between the radiation detector and the constriction maximum is less than two thirds of a downstream half-length of the constriction.

13. The particulate matter sensor device according to claim 1, wherein said constriction defines an opening angle, the opening angle exhibiting a change per millimeter between 1° per millimeter and 10° per millimeter.

14. The particulate matter sensor device according to claim 1, wherein a maximum opening angle of said constriction is in a range between 1° and a stall angle, said stall angle being in a range of 5° to 10°.

15. The particulate matter sensor device according to claim 1,
wherein the constriction extends over a constriction region and defines a constriction maximum,
wherein a distance $L_0$ between said constriction maximum and a position of a maximum opening angle $\Theta_{max}$ complies with the formula:

$$L_0 = \frac{\Theta_{max}}{\beta}$$

or wherein a constricted clear minimum width D1 at the constriction maximum complies with the formula:

$$D_1 \leq D_0 + \frac{2}{\beta}\log(\cos(\beta * L_0))$$

$D_0$ designating an average flow channel diameter,
or wherein a distance L1 between said constriction maximum and a position of a stall angle SA is chosen according to the formula:

$$L_1 = \frac{SA}{\beta}$$

$\beta$ designating an opening angle change per millimeter of said constriction.

16. The particulate matter sensor device according to claim 1, wherein the additional flow opening is arranged in a radial wall section of the flow channel, the radial wall section radially delimiting the flow channel upstream of the radiation detector or the radiation source.

17. The particulate matter sensor device according to claim 1, wherein the constriction extends over a constriction region and defines a constriction maximum, and wherein the additional flow opening is arranged downstream of the constriction maximum.

18. A particulate matter sensor device comprising:
an enclosure defining a flow channel;
a radiation source for emitting radiation into the flow channel for interaction of the radiation with particulate matter in an aerosol sample in the flow channel;
a radiation detector for detecting at least part of said radiation after interaction with the particulate matter;
an additional flow opening for creating an additional flow into the flow channel;
an environmental sensor for determining at least one environmental parameter, the environmental sensor being disposed in a flow path of the additional flow upstream from the additional flow opening; and a compensation device programmed to:

read out the environmental sensor to determine an environmental parameter of the additional flow, the environmental parameter being indicative of a property of a gas in the additional flow;

receive information indicative of an amount of heat ingress into the environmental sensor and/or into the gas of the additional flow before it reaches the environmental sensor; and derive a compensated environmental parameter, the compensated environmental parameter being indicative of the property of the gas before said gas entered the particulate matter sensor device, the compensation device being configured to compensate for the heat ingress when determining the compensated environmental parameter.

19. The particulate matter sensor device according to claim 18, wherein the environmental sensor is configured to determine at least one of:

a humidity; and a concentration of one or more target gases.

20. The particulate matter sensor device according to claim 18, comprising a filter for filtering the additional flow, the environmental sensor being disposed in the flow path of the additional flow downstream of the filter.

21. The particulate matter sensor device according to claim 18, wherein the flow path of the additional flow is delimited by the enclosure.

22. The particulate matter sensor device according to claim 21, wherein the enclosure defines a primary flow inlet into the flow channel and a secondary flow inlet for receiving a gas that is to form the additional flow, the secondary flow inlet being separate from the primary flow inlet.

23. The particulate matter sensor device according to claim 22, wherein the particulate matter sensor device is configured to create a negative pressure at the secondary flow inlet.

24. The particulate matter sensor device according to claim 18, wherein the radiation detector is arranged in a flow path of the additional flow downstream of the environmental sensor.

25. The particulate matter sensor device according to claim 18, wherein the radiation detector and the environmental sensor are mounted on a common circuit board.

26. The particulate matter sensor device according to claim 25, wherein the circuit board comprises one or more through-holes allowing the additional flow to traverse the circuit board.

27. The particulate matter sensor device according to claim 25, wherein the radiation detector and the environmental sensor are arranged on opposite sides of the circuit board.

28. The particulate matter sensor device according to claim 18, wherein the compensation device is further programmed to receive information about a dissipated electric power of at least one of the radiation source and the radiation detector and to compensate for the heat ingress that results from the dissipated electric power.

29. The particulate matter sensor device according to claim 28, wherein the environmental sensor is configured to determine a temperature, and wherein the compensation device is further programmed to compensate for the heat ingress by employing an empirically determined lookup table that correlates the dissipated electric power with an increase of measured temperature by the environmental sensor.

30. A particulate matter sensor device comprising:
an enclosure defining a flow channel;
a radiation source for emitting radiation into the flow channel for interaction of the radiation with particulate matter in an aerosol sample in the flow channel;
a radiation detector for detecting at least part of said radiation after interaction with the particulate matter;
a circuit board, wherein the radiation detector is mounted on the circuit board;
an additional flow opening for creating an additional flow into the flow channel, wherein the additional flow opening is configured to create the additional flow in such a manner that the additional flow overflows the radiation detector, thereby sheathing the radiation detector; and
an environmental sensor for determining at least one environmental parameter, the environmental sensor being disposed in a flow path of the additional flow upstream of the additional flow opening,
wherein the radiation detector is arranged in a flow path of the additional flow downstream of the environmental sensor.

31. The particulate matter sensor device according to claim 30, wherein the environmental sensor is configured to determine at least one of:
a humidity; and
a concentration of one or more target gases.

32. The particulate matter sensor device according to claim 30, wherein both the radiation detector and the environmental sensor are mounted on the circuit board.

33. The particulate matter sensor device according to claim 32,
wherein the circuit board comprises one or more through-holes allowing the additional flow to traverse the circuit board, and
wherein the radiation detector and the environmental sensor are arranged on opposite sides of the circuit board, such that the additional flow first passes the environmental sensor on a first side of the circuit board, is then directed to a second side of the circuit board that is opposite to the first side and there passes the radiation detector.

* * * * *